United States Patent

Ise et al.

[11] Patent Number: 6,010,582
[45] Date of Patent: Jan. 4, 2000

[54] PROCESS FOR PRODUCING HYDROGEN-OCCLUSION ALLOY ELECTRODE OF ALKALINE STORAGE BATTERY

[75] Inventors: Tadashi Ise; Hiroshi Fukuda; Nobuyasu Ishimaru, all of Tokushima, Japan

[73] Assignee: Sanyo Electric Co., Ltd., Moriguchi, Japan

[21] Appl. No.: 08/913,845

[22] PCT Filed: Apr. 5, 1996

[86] PCT No.: PCT/JP96/00954

§ 371 Date: Mar. 18, 1998

§ 102(e) Date: Mar. 18, 1998

[87] PCT Pub. No.: WO96/31911

PCT Pub. Date: Oct. 10, 1996

[30] Foreign Application Priority Data

| Apr. 5, 1995 | [JP] | Japan | 7-080346 |
| Jul. 28, 1995 | [JP] | Japan | 7-192883 |
| Aug. 7, 1995 | [JP] | Japan | 7-201095 |

[51] Int. Cl.[7] .................................................. C21D 10/00
[52] U.S. Cl. .................................................. 148/513
[58] Field of Search .................................................. 148/513

[56] References Cited

U.S. PATENT DOCUMENTS

| 5,104,617 | 4/1992 | Fetcenko et al. | 420/588 |
| 5,389,468 | 2/1995 | Fujiwara et al. | 429/206 |
| 5,518,509 | 5/1996 | Tadokoro et al. | 29/623.5 |
| 5,605,585 | 2/1997 | Yamamota et al. | 148/513 |
| 5,616,432 | 4/1997 | Ovshinsky et al. | 429/59 |
| 5,837,317 | 11/1998 | Moriwaki et al. | 427/217 |

FOREIGN PATENT DOCUMENTS

| 61-176063 | 8/1986 | Japan . |
| 3-152868 | 6/1991 | Japan . |

*Primary Examiner*—Daniel J. Jenkins
*Attorney, Agent, or Firm*—Foley & Lardner

[57] ABSTRACT

An object of the present invention is to provide a method for producing a hydrogen-absorbing alloy electrode for an alkaline storage battery which is efficient and effective enough to improve the performance of the battery. The method according to the present invention comprises the steps of: preparing a powdery hydrogen-absorbing alloy; and washing the powdery hydrogen-absorbing alloy with a strong acid solution and then with a weak acid solution having a higher pH value than the strong acid solution for a two-stage acid treatment.

24 Claims, 6 Drawing Sheets

RELATIONSHIP OF Na$_2$HPO$_4$ CONCENTRATION OF SURFACE TREATMENT SOLUTION VS. INITIAL BATTERY INTERNAL PRESSURE

RELATIONSHIP OF $Na_2HPO_4$ CONCENTRATION OF SURFACE TREATMENT SOLUTION VS. INITIAL BATTERY INTERNAL PRESSURE

RELATIONSHIP OF $Na_2HPO_4$ CONCENTRATION OF SURFACE TREATMENT SOLUTION VS. HIGH-RATE DISCHARGE CHARACTERISTIC

RELATIONSHIP OF $Na_2HPO_4$ CONCENTRATION OF SURFACE TREATMENT SOLUTION VS. CYCLE LIFETIME

RELATIONSHIP BETWEEN ALLOY TREATMENT CONDITIONS AND INITIAL BATTERY INTERNAL PRESSURE

RELATIONSHIP BETWEEN ALLOY TREATMENT CONDITIONS AND HIGH-RATE DISCHARGE CHARACTERISTIC

RELATIONSHIP BETWEEN ALLOY TREATMENT CONDITIONS AND CYCLE LIFETIME

RELATIONSHIP OF $Na_2HPO_4$ CONCENTRATION OF SOAKING SOLUTION VS. INITIAL BATTERY INTERNAL PRESSURE

RELATIONSHIP OF $Na_2HPO_4$ CONCENTRATION OF SOAKING SOLUTION VS. HIGH-RATE DISCHARGE CHARACTERISTIC

RELATIONSHIP OF $Na_2HPO_4$ CONCENTRATION OF SOAKING SOLUTION VS. CYCLE LIFETIME

RELATIONSHIP OF $Na_2HPO_4$ CONCENTRATION OF WASHING SOLUTION VS. INITIAL BATTERY INTERNAL PRESSURE

RELATIONSHIP OF $Na_2HPO_4$ CONCENTRATION OF WASHING SOLUTION VS. HIGH-RATE DISCHARGE CHARACTERISTIC

RELATIONSHIP OF $Na_2HPO_4$ CONCENTRATION OF WASHING SOLUTION VS. CYCLE LIFETIME

PROCESS FOR PRODUCING HYDROGEN-OCCLUSION ALLOY ELECTRODE OF ALKALINE STORAGE BATTERY

TECHNICAL FIELD

The present invention relates to a method for producing a hydrogen-absorbing alloy electrode for an alkaline storage battery. More particularly, the invention relates to a method for treating a powdery hydrogen-absorbing alloy which is to be used as a material for a hydrogen-absorbing alloy electrode.

BACKGROUND ART

Alkaline secondary batteries such as nickel-cadmium batteries have conventionally been used as driving power sources or backup batteries for electronic apparatuses. As the performance of such electronic apparatuses are improved, nickel-hydrogen batteries are increasingly used which have a higher capacity and a longer lifetime than the nickel-cadmium batteries.

The performance of a nickel-hydrogen battery depends on the activity of a hydrogen-absorbing alloy serving as a negative-electrode active substance. Therefore, a storage battery of this type employs fine powder of the hydrogen-absorbing alloy. The fine powder of the hydrogen-absorbing alloy has a large surface area for an electrochemical reaction and can be filled in an electrode substrate at a high density, thereby increasing battery capacity.

However, the hydrogen-absorbing alloy which is an extremely active substance is susceptible to oxidation during pulverization thereof to form an oxide film on a surface thereof. The oxide film reduces the electrical conductivity of the alloy and inhibits initial activation of the alloy. In view of the foregoing, there have been proposed various treatment methods for recovering the activity of the alloy subjected to the oxidation during the pulverization process, as follows:

(1) A method disclosed in Japanese Unexamined Patent Publication No. 3-98259 (1991) in which a powdery hydrogen-absorbing alloy is treated with hot water at a temperature of higher than 60° C.;

(2) A method disclosed in Japanese Unexamined Patent Publication No. 4-179055 (1992) in which a powdery hydrogen-absorbing alloy is soaked in an acid solution and then rinsed with water;

(3) A method disclosed in Japanese Unexamined Patent Publication No. 4-98760 (1992) in which a powdery hydrogen-absorbing alloy is soaked in an acid solution and then in an alkaline aqueous solution, and rinsed with water; and (4) A method disclosed in Japanese Unexamined Patent Publication No. 3-49154 (1991) in which a powdery hydrogen-absorbing alloy is mixed with a binder to form a slurry, and a phosphate or silicate is added to the slurry to suppress the oxidation of the hydrogen-absorbing alloy when the alloy is pulverized or stored.

However, the aforesaid methods suffer from the following problems:

(1) Problem of the art disclosed in Japanese Unexamined Patent Publication No. 3-98259

This art requires a considerable time for the treatment, and cannot provide a satisfactory effect for the removal of the oxide film or the like;

(2) Problem of the art disclosed in Japanese Unexamined Patent Publication No. 4-179055

In this art, an oxide layer is removed in a short time by soaking the powdery hydrogen-absorbing alloy in the acid solution. The oxide film and the like can be more effectively removed and the treatment is simpler than the aforesaid method (1). Further, where the powdery alloy is sufficiently soaked in an acid solution of a higher concentration, the oxide film and the like formed on the surface of the alloy can be sufficiently removed and, therefore, use efficiency of the surface of the alloy can be improved.

However, the use of the higher-concentration acid solution causes a hydroxide layer to be newly formed on the surface of the alloy during the acid treatment (the reason will be described later). The newly formed hydroxide layer results in an increase in the internal pressure of a battery at initial charging and deterioration of the high-rate discharging characteristic thereof. In addition, the yield of the treated alloy is reduced.

On the other hand, if the concentration of the acid solution is reduced in consideration of the aforesaid problem, a solid hydroxide layer on the surface of the powdery hydrogen-absorbing alloy cannot be sufficiently removed. Thus, a satisfactory effect of the acid treatment cannot be obtained.

(3) Problem of the art disclosed in Japanese Unexamined Patent Publication No. 4-98760

In this art, an oxide layer on the surface of the alloy is removed by preliminarily soaking the alloy in the acid solution, and then the surface of the powdery hydrogen-absorbing alloy is covered with a hydroxide layer having many grain boundaries to ensure a satisfactory discharge capacity in an initial charge-discharge process. However, since the alloy surface is covered with the hydroxide layer according to this art, the internal pressure of a battery at initial charging is increased, and a satisfactory high-rate discharging characteristic cannot be ensured.

(4) Problem of the art disclosed in Japanese Unexamined Patent Publication No. 3-49154

This art, in which an additive such as a phosphate is simply blended with the alloy, is effective in that the oxidation of the alloy can be suppressed during production of an electrode. However, the activity of the alloy cannot be sufficiently increased.

DISCLOSURE OF THE INVENTION

It is an object of the present invention to provide a method for producing a hydrogen-absorbing alloy electrode for an alkaline storage battery, which is efficient and effective enough to improve the performance of the battery.

A method according to the present invention comprises the steps of: preparing a powdery hydrogen-absorbing alloy; and washing the powdery hydrogen-absorbing alloy with a strong acid solution and then with a weak acid solution having a higher pH value than the strong acid solution for a two-stage acid treatment.

In accordance with this method, an oxide layer or a hydroxide layer formed on the surface of the alloy is removed, and a catalytically active metal isolation layer (Ni-rich layer) is formed on the alloy surface during the first treatment with the strong acid. Further, a hydroxide layer newly formed on the alloy surface during the first acid treatment is removed during the second treatment with the weak acid.

Therefore, an electrode formed of the hydrogen-absorbing alloy subjected to the two-stage acid treatment according to the present invention offers improved battery characteristics in various aspects in comparison with an electrode formed of a hydrogen-absorbing alloy treated by a one-stage acid treatment (including an acid treatment method in which an acid treatment is performed a plurality of times under the same conditions) or treated by a two-stage treatment process including a one-stage acid treatment and a subsequent alkali treatment. The reason for the improvement in the battery characteristics will hereinafter be described.

The one-stage acid treatment process (disclosed in Japanese Unexamined Patent Publication No. 4-179055 and the like) involves the following inconvenience. Hydrogen ions in a treatment solution are consumed during the strong acid treatment of the alloy, whereby the pH value of the treatment solution is increased. When the pH value of the treatment solution is low, the oxide layer and the hydroxide layer are readily dissolved in the treatment solution. When the dissolving reaction proceeds and the pH value of the treatment solution exceeds pH5, however, the solubilities of ions of rare earth elements and the like are reduced, so that the ions dissolved in the treatment solution are deposited on the alloy surface to form a hydroxide layer. The hydroxide layer cannot be removed by way of a water-washing treatment to be thereafter performed.

That is, the one-stage acid treatment causes the hydroxide layer to be newly formed on the alloy surface by redeposition. This results in a problem that prevent improvement in various characteristics such as a battery internal pressure characteristic at initial charging, high-rate discharge characteristic and cycle characteristic of a hydrogen-absorbing alloy electrode.

In the two-stage acid/alkali treatment process including the one-stage acid treatment and the subsequent alkali treatment (disclosed in Japanese Unexamined Patent Publication No. 4-98760), a hydroxide layer is naturally formed on the alloy surface during the alkali treatment in the second stage. Therefore, this method cannot solve the aforesaid problem.

In accordance with the present invention, the second weak acid treatment follows the first strong acid treatment. Therefore, the hydroxide layer formed during the first strong acid treatment can be removed during the second weak acid treatment. This is because, where the weak acid is used as a treatment solution for the second treatment, very little amount of components of the alloy is dissolved in the treatment solution and, therefore, the concentration of ions (ions of rare earth elements and the like) dissolved in the treatment solution is not increased. In addition, the hydroxide layer formed during the first treatment can readily be removed because it is soluble in the weak acid.

Therefore, a battery using an electrode prepared in accordance with the method of the present invention exhibits a reduced internal pressure at initial charging, and offers remarkable improvement in the high-rate discharge characteristic and the cycle characteristic.

In the two-stage acid treatment according to the present invention, the strong acid solution to be used in the first acid treatment preferably has a pH value of not lower than pH0.5 and not higher than pH2.0, and the weak acid solution to be used in the second acid treatment preferably has a pH value of higher than pH2.0 and not higher than pH5.0, more preferably a pH value of not lower than pH2.2 and not higher than pH5.0. This is because, in view of a relationship between the battery internal pressure at initial charging and the pH value of the treatment solution for the second acid treatment, the battery internal pressure level is drastically changed around pH2.0 and is significantly improved at a pH value of higher than pH2.0. Further, where the pH value of the treatment solution for the second acid treatment is not lower than pH2.2, not only the battery internal pressure level but also the high-rate discharge characteristic level and the cycle characteristic level can be remarkably improved.

Furthermore, in the two-stage acid treatment according to the present invention, it is more preferable that a buffer solution having a pH value of higher than pH2.0 and not higher than pH5 is used as the weak acid solution of the aforesaid pH value. This is because the acid treatment solution offering a buffer action can maintain an optimum pH value for the removal of the hydroxide layer. The buffer solution more preferably has a pH value of not lower than pH2.2 and not higher than pH5. This is because the hydroxide layer (including hydroxides of rare earth elements, for example) has a pH-dependent solubility. Therefore, by using the treatment solution offering the buffer action to suppress the pH rise during the acid treatment, the optimum pH value can be maintained for a long period of time, thereby ensuring effective removal of the hydroxide layer.

Another method according to the present invention comprises the steps of: preparing a powdery hydrogen-absorbing alloy; soaking the powdery hydrogen-absorbing alloy in an acid solution for an acid treatment; and surface-treating the acid-treated powdery hydrogen-absorbing alloy with an aqueous solution of a 0.6 wt % to 10 wt % oxo acid salt for an oxo-acid-salt surface treatment.

When the alloy subjected to the acid treatment is treated with the aqueous solution of the oxo acid salt, hydroxides of rare earth elements formed on the surface of the alloy react with oxo acid ions in the treatment solution to form oxo acid compounds of the rare earth elements. Since the oxo acid compounds of the rare earth elements are more hydrophilic than the hydroxides, the liquid-retaining property of the alloy surface is proved. This allows the alloy to come in more intimate contact with an electrolyte of a battery, thereby facilitating electrochemical reactions such as an oxygen-consuming reaction. As a result, such effects as reduction in the initial internal pressure and improvement in the high-rate discharge characteristic can be ensured.

The concentration of the oxo acid salt in the surface treatment solution is adjusted within a range between 0.6 wt % to 10 wt % for the following reason.

In order to improve the liquid-retaining property of the alloy surface, it is desirable to increase the concentration of the oxo acid salt in the surface treatment solution. Where the concentration of the oxo acid salt is extremely high, however, the oxo acid salt remains in the alloy in an amount greater than required. The remaining oxo acid salt is released in the electrolyte to remarkably deteriorate the cycle characteristic. To prevent the deterioration of the cycle characteristic, the concentration of the oxo acid salt should be maintained in an optimum range. For this reason, by adjusting the concentration of the oxo acid salt in the surface treatment solution within a range between 0.6% to 10% by weight, the initial internal pressure characteristic and the high-rate discharge characteristic can be improved without the deterioration of the cycle characteristic.

For the same reason as described above, it is preferred that the powdery alloy subjected to the surface treatment with the aqueous solution of the oxo acid salt is soaked (or allowed to stand) in pure water (deionized water) or in a low-concentration aqueous solution of the oxo acid salt for more than 24 hours to remove the oxo acid salt contained in the alloy in excess.

Further, the low-concentration aqueous solution of the oxo acid salt preferably has a concentration in a range between 0.1 wt % to 1 wt %. This is because the concentration in the aforesaid range allows the oxo acid salt to remain in the alloy in an amount that allows the alloy to have a liquid-retaining property while allowing the oxo acid salt in excess to be removed.

Instead of the 24-hour soaking treatment, the powdery alloy is preferably subjected to a stirring-wash treatment with pure water or a low-concentration aqueous solution of an oxo acid salt. In this case, the low-concentration aqueous solution of the oxo acid salt preferably has a concentration in a range between 0.1 wt % to 1 wt %. The stirring-wash treatment can provide the same effect as the 24-hour soaking treatment in a significantly shorter time.

It should be noted that the term "soaking treatment" means that the powdery alloy and the treatment solution are maintained still (or allowed to stand). The term "stirring-wash treatment", which is a concept contrary to the soaking treatment, means that the powdery alloy is dynamically brought in contact with pure water or the aqueous solution of the oxo acid salt. This may be achieved in any manner by moving either the powdery alloy or the solution.

Still another method according to the present invention comprises the steps of: preparing a powdery hydrogen-absorbing alloy; treating the powdery hydrogen-absorbing alloy in an acid solution for an acid treatment; and washing the powdery hydrogen-absorbing alloy to such an extent that the amount of residual anions taken in the hydrogen-absorbing alloy during the acid treatment is reduced to not higher than $5 \times 10^{-6}$ mol/g with respect to the hydrogen-absorbing alloy.

In accordance with this method, since the alloy is washed until the concentration of the anions taken in the alloy (particularly in a surface portion of the alloy) is reduced to not higher than $5 \times 10^{-6}$ mol/g-alloy, the residual anions will not adversely affect the battery performance. Therefore, where the hydrogen-absorbing alloy treated in accordance with the present invention is employed, the activity of the alloy can be enhanced by an initial charge-discharge process. Further, an alkaline storage battery can be obtained which is excellent in the high-rate discharge characteristic, the low-temperature discharge characteristic and the cycle characteristic, since the residual anions do not deteriorate the activities of positive and negative electrodes thereof.

Where the acid solution to be used in the acid treatment has a pH value of pH0.5 to pH3.5 in the aforesaid method, the effect for the oxide film removal can be further enhanced.

Where an aqueous solution including an anti-oxidation agent is used as the washing liquid for the washing treatment, the residual anions in the alloy can be reduced more rapidly and assuredly than the case where pure water is used.

Further, where the alloy washed in the washing treatment is soaked in the aqueous solution containing the anti-oxidation agent, the anti-oxidation effect can be enhanced by keeping the alloy out of the outside air and, at the same time, a trace amount of the residual anions not washed away during the washing treatment can be removed to a greater extent.

The effects of the aforesaid acid treatment and washing treatment can be ensured regardless of the kind of an alloy, but are remarkable when these treatments are applied to a hydrogen-absorbing alloy having a ununiform distortion of not greater than $4.0 \times 10^{-3}$. The reason is as follows.

An alloy having a small ununiform distortion has a stronger resistance to an expansion-contraction energy thereof associated with the absorption and desorption of hydrogen than an alloy having a greater ununiform distortion and, therefore, is insusceptible to disintegration in progress of the charge-discharge cycle. Therefore, the alloy with the small ununiform distortion which is surface-treated by the method according to the present invention can maintain its initial optimum surface conditions (or its initial active state) for a long period of time. On the other hand, the alloy with a greater ununiform distortion suffers from cracks formed in progress of the charge-discharge cycle, whereby new surfaces (surfaces not activated) of the alloy appear. Therefore, it is considered that the effect of the treatment according to the present invention will become smaller than intended in the case of the alloy having a greater ununiform distortion.

Yet another method according to the present invention comprises the steps of: preparing a powdery hydrogen-absorbing alloy; washing the powdery hydrogen-absorbing alloy with a strong acid solution and then with a weak acid solution having a higher pH value than the strong acid solution for a two-stage acid treatment; and surface-treating the powdery hydrogen-absorbing alloy subjected to the two-stage acid treatment with an aqueous solution of a 0.6 wt % to 10 wt % oxo acid salt for an oxo-acid-salt surface treatment.

Since the aforesaid method includes the two-stage acid treatment and the oxo-acid-salt surface treatment, a synergistic effect of these two treatments can be expected to further improve the battery characteristics.

Still another method according to the present invention comprises the steps of: preparing a powdery hydrogen-absorbing alloy; washing the powdery hydrogen-absorbing alloy with a strong acid solution and then with a weak acid solution having a higher pH value than the strong acid solution for a two-stage acid treatment; and washing the powdery hydrogen-absorbing alloy to such an extent that the amount of residual anions taken in the hydrogen-absorbing alloy during the acid treatment is reduced to not higher than $5 \times 10^{-6}$ mol/g with respect to the powdery hydrogen-absorbing alloy.

Since the aforesaid method includes the two-stage acid treatment and the washing treatment, a synergistic effect of these two treatments can be expected to further improve the battery characteristics.

Yet another method according to the present invention comprises the steps of: preparing a powdery hydrogen-absorbing alloy; washing the powdery hydrogen-absorbing alloy with a strong acid solution and then with a weak acid solution having a higher pH value than the strong acid solution for a two-stage acid treatment; surface-treating the powdery hydrogen-absorbing alloy subjected to the two-stage acid treatment with an aqueous solution of a 0.6 wt % to 10 wt % oxo acid salt for an oxo-acid-salt surface treatment; and washing the powdery hydrogen-absorbing alloy to such an extent that the amount of residual anions taken in the powdery hydrogen-absorbing alloy is reduced to not higher than $5 \times 10^{-6}$ mol/g with respect to the hydrogen-absorbing alloy.

Since the aforesaid method includes the two-stage acid treatment, the oxo-acid-salt surface treatment and the washing treatment, a synergistic effect of these three treatments can be expected to further improve the battery characteristics.

BEST MODE FOR CARRYING OUT THE INVENTION

Figure 1:
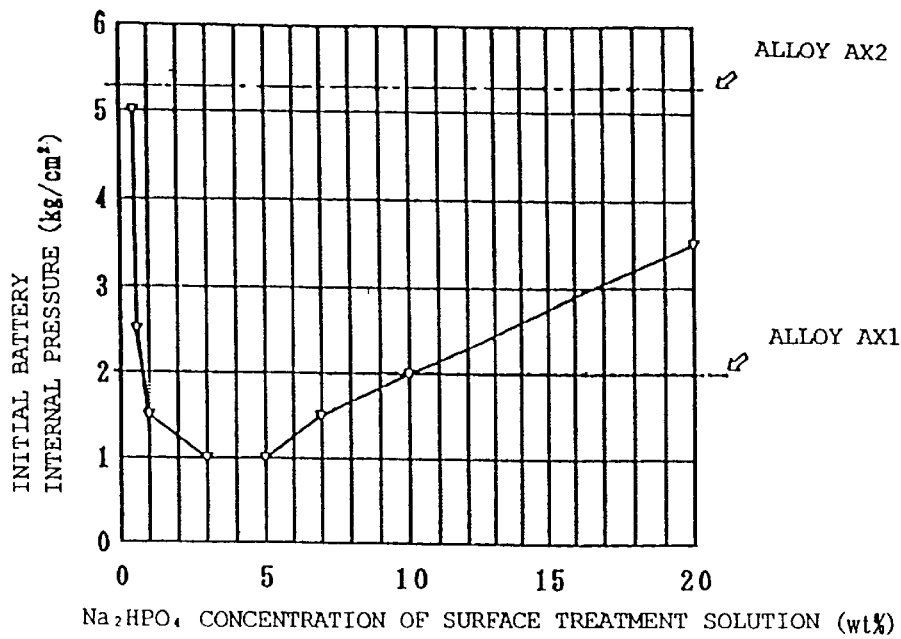
FIG. 1 is a graphical representation illustrating the relationship of $Na_2HPO_4$ concentration of a surface treatment solution used for a surface treatment of a hydrogen-absorbing alloy after an acid treatment versus an initial battery internal pressure.

The present invention will hereinafter be described more specifically on the basis of experiments.
Mode 1
Preparation of powdery hydrogen-absorbing alloy A commercially available Misch metal (Mm: a mixture of rare earth metals such as La, Ce, Nd and Pr), nickel (Ni), cobalt (Co), aluminum (Al) and manganese (Mn) were weighed in an element ratio of 1:3.4:0.8:0.2:0.6, and then heat-treated at 1,000° C. in a high-frequency fusion furnace for 10 hours to prepare a cast mass of a hydrogen-absorbing alloy represented by a composition formula of $MmNi_{3.4}Co_{0.8}Al_{0.2}Mn_{0.6}$. In turn, the alloy cast mass was mechanically pulverized in an atmosphere of nitrogen gas. The alloy powder was classified by means of a 100-mesh sieve (aperture size: 150 μm) and a 500-mesh sieve (aperture size: 25 μm). Alloy powder having particle sizes between 100 mesh and 500 mesh was obtained.
Acid treatment Each of aqueous solutions of hydrochloric acid having pH values shown in a column "First acid treatment" of Table 1 was added to the powdery hydrogen-absorbing alloy thus prepared in an amount of 100% by weight with respect to the alloy, and then stirred in a stirring mixer until the pH value thereof reached pH7 (first acid treatment). Thereafter, the treatment solution in the stirring mixer was removed. Thus, first acid-treated powdery hydrogen-absorbing alloys were obtained.

In turn, acidic solutions shown in a column "Second acid treatment" of Table 1 were respectively added to the powdery hydrogen-absorbing alloys subjected to the first acid treatment in an amount of 100% by weight with respect to the alloys, and then each stirred in the stirring mixer for 10 minutes (second acid treatment). Thereafter, the treatment solutions were removed, and deionized water was added to each of the powdery alloys subjected to the two-stage acid treatment in an amount of 100% by weight with respect the alloys, and then stirred for 10 minutes for water-washing thereof. Then, the powdery alloys were dried in vacuum. Thus, powdery hydrogen-absorbing alloys treated in the two-stage acid treatment according to the present invention were obtained.

In Table 1, buffer solutions A were prepared by adding an aqueous solution of 0.2 mol/l hydrochloric acid to an aqueous solution of 0.2 mol/l potassium hydrogen phthalate to adjust the pH values thereof to pH2.2 and pH3.0. Buffer solutions B were prepared by adding an aqueous solution of 0.2 mol/l sodium hydroxide to an aqueous solution of 0.2 mol/l potassium hydrogen phthalate to adjust the pH values thereof to pH4.0, pH5.0 and pH6.0. Buffer solutions C were prepared by adding an aqueous solution of 0.1 mol/l citric acid to an aqueous solution of 0.2 mol/l disodium hydrogen phosphate to adjust the pH values thereof to pH2.0, pH3.0, pH4.0, pH5.0 and pH6.0.
Production of hydrogen-absorbing alloy electrodes A binder of a polytetrafluoroethylene dispersion was added to each of the powdery hydrogen-absorbing alloys subjected to the two-stage acid treatment in an amount of 5% by weight with respect to the alloys. The mixtures were each kneaded and formed into a sheet form. The alloy sheets thus obtained were each press-bonded onto opposite sides of a punching metal. Thus, hydrogen-absorbing alloy electrodes according to the present invention were obtained.
Fabrication of storage batteries Each of the hydrogen-absorbing alloy electrodes (to be used as a negative electrode) and a known sintered nickel positive electrode having a lower capacity than the negative electrode were rolled with a separator interposed therebetween to form an electrode roll. After the electrode roll was inserted into a case and an aqueous solution of 30 wt % potassium hydroxide was poured therein, the case is sealed. Thus, cylindrical nickel-hydrogen storage batteries each having a theoretical capacity of 1,000 mA were fabricated.

These storage batteries were used to evaluate the respective powdery hydrogen-absorbing alloys prepared in the aforesaid manner from such aspects as an internal pressure characteristic at initial charging and a charge-discharge cycle characteristic.
Fabrication of test cells Besides the aforesaid storage batteries, test cells were prepared in the following manner to evaluate the respective powdery hydrogen-absorbing alloys from an aspect of a high-rate discharge characteristic.

An alloy paste was prepared by mixing 1 g of each of the powdery alloys with 1.2 g of carbonyl nickel as a conductive agent and 0.2 g of a polytetrafluoroethylene dispersion as a binder and then kneading the mixture. The alloy pastes thus obtained were each wrapped with a nickel mesh and subjected to a press working. Thus, hydrogen-absorbing alloy electrodes were produced.

Subsequently, each of the hydrogen-absorbing alloy electrodes (used as a negative electrode) and a known sintered nickel positive electrode having a significantly larger capacity than the negative electrode were placed in a cell. Then, a potassium hydroxide electrolyte was poured in an excess amount into the cell, which was thereafter sealed. The cells thus obtained were called "test cells".

Battery characteristics and evaluation thereof

① Test conditions for battery internal pressure characteristic at initial charging After the aforesaid storage batteries were each charged at a current of 1,000 mA for one hour, the internal pressure (kg/cm²) thereof was measured.

② Test conditions for charge-discharge cycle characteristic

The storage batteries were first subjected to an initial activation process by performing a charge-discharge process (for three cycles at room temperature) under the following conditions.

Charging: 100 mA×16 hours with a recess of 1 hour
Discharging: 200 mA with a discharge termination voltage of 1.0V and a recess of 1 hour In turn, a charge-discharge process was performed under the following conditions. It was herein defined that a battery lifetime expired when the discharge capacity (battery capacity) was reduced to 500 mA or lower, and the number of cycles before the expiration of the battery lifetime was measured.

Charging: 1,500 mA×48 minutes with a recess of 1 hour
Discharging: 1,500 mA with a discharge termination voltage of 1.0V and a recess of 1 hour ③ Test conditions for high-rate discharge characteristic
(1) By using the aforesaid test cells, a charge-discharge process was performed under the following conditions, and the discharge capacity (CH) at discharging was measured.

Charging: A current of 50 mA for each gram of hydrogen-absorbing alloy (50 mA/g-alloy)×8 hours with a recess of 1 hour
Discharging: A current of 200 mA/g-alloy with a discharge termination voltage of 1.0V (2) After a recess of 1 hour, the battery voltage of each of the test cells was restored. Then, the test cells were each discharged under the following conditions, and the discharge capacity (CL) was measured.

Discharging: A current of 50 mA/g-alloy with a discharge termination voltage of 1.0V (3) Subsequently, the high-rate discharge characteristic was calculated from the following equation (1):

High-Rate Discharge Characteristic$(\%) = CH/(CH+CL) \times 100$  (1)

The results of the measurements obtained under the test conditions described above are shown in the corresponding columns of Table 1.

TABLE 1

| | Treatment conditions | | Storage battery characteristics | | |
|---|---|---|---|---|---|
| Alloy No. | First acid treatment Kind and pH of acid | Second acid treatment Kind and pH of acid | Initial battery internal pressure (Kg/cm²) | High-rate discharge characteristic (%) | Cycle lifetime (Cycle number) |
| AW1 | Not treated | Not treated | 2.0 | 60 | 917 |
| *AA1 | H. a. – 0.5 | H. a. – 4.0 | 1.0 | 82 | 1135 |
| AA2 | H. a. – 1.0 | H. a. – ▓ | ▓ | ▓ | ▓ |
| *AA3 | H. a. – 1.0 | H. a. – ▓ | ▓ | ▓ | ▓ |
| *AA4 | H. a. – 1.0 | H. a. – 2.2 | 2.0 | 80 | 1130 |
| *AA5 | H. a. – 1.0 | H. a. – 3.0 | 1.5 | 82 | 1140 |
| *AA6 | H. a. – 1.0 | H. a. – 4.0 | 1.0 | 85 | 1150 |
| *AA7 | H. a. – 1.0 | H. a. – 5.0 | 1.5 | 82 | 1145 |
| *AA8 | H. a. – 1.0 | H. a. – ▓ | ▓ | ▓ | ▓ |
| AW2 | H. a. – 1.0 | Not treated | 5.3 | 72 | 1100 |
| *AA9 | H. a. – 1.5 | H. a. – 4.0 | 1.0 | 84 | 1145 |
| *AA10 | H. a. – 2.0 | H. a. – 4.0 | 1.0 | 84 | 1145 |
| *AA11 | H. a. – ▓ | H. a. – 4.0 | 1.0 | ▓ | ▓ |
| AA12 | H. a. – ▓ | H. a. – 4.0 | 1.0 | ▓ | ▓ |
| *AA13 | H. a. – 2.0 | H. a. – 4.0 | 1.0 | 84 | 1145 |
| *AA14 | H. a. – 2.0 | P. a. – 4.0 | 1.0 | 84 | 1145 |
| *AA15 | H. a. – 1.0 | B. s. A – 2.2 | 1.0 | 85 | 1150 |
| *AA16 | H. a. – 1.0 | B. s. A – 3.0 | 0.7 | 87 | 1160 |
| *AA17 | H. a. – 1.0 | B. s. B – 4.0 | 0.5 | 88 | 1170 |
| *AA18 | H. a. – 1.0 | B. s. B – 5.0 | 1.0 | 85 | 1150 |
| *AA19 | H. a. – 1.0 | B. s. B – ▓ | ▓ | ▓ | ▓ |
| *AA20 | H. a. – 1.0 | B. s. C – 2.2 | 1.0 | 85 | 1150 |
| *AA21 | H. a. – 1.0 | B. s. C – 3.0 | 0.7 | 87 | 1160 |
| *AA22 | H. a. – 1.0 | B. s. C – 4.0 | 0.5 | 88 | 1170 |
| *AA23 | H. a. – 1.0 | B. s. C – 5.0 | 1.0 | 85 | 1150 |
| *AA24 | H. a. – 1.0 | B. s. C – ▓ | ▓ | ▓ | ▓ |
| AW3 | H. a. – 1.0 | KOH – ▓ | ▓ | ▓ | 1150 |

H. a.: Hydrochloric acid
P. a.: Phosphoric acid
B. s.: Buffer solution

In Table 1, an alloy AW2 treated with a strong acid in the first stage and not subjected to the second treatment (this treatment process is hereinafter referred to as "one-stage acid treatment) and an alloy AW3 treated with a strong acid in the first stage and with an alkali (pH15.0) in the second stage (this treatment process is hereinafter referred to as "two-stage acid-alkali treatment) are defined as comparative references. The alloys AW2 and AW3 were compared with alloys AA1, AA3 to AA8, AA9 to AA11 and AA13 to AA24 (indicated by * in Table 1) subjected to the two-stage acid treatment according to the present invention in which a strong acid aqueous solution was used in the first stage and a weak acid aqueous solution having a weaker acidity than the strong acid aqueous solution was used in the second stage.

The alloys AW2 and AW3 (comparative references) offered initial battery internal pressures of 5.3 kg/cm$^2$ and 4.5 kg/cm$^2$, high-rate discharge characteristics of 72% and 72%, and cycle characteristics of 1,100 cycles and 1,150 cycles, respectively. When picking up only the worst levels of the characteristics from those of the alloys AA1, AA3 to AA8, AA9 to AA11 and AA13 to AA24 to which the two-stage acid treatment according to the present invention is applied, the worst level of the initial battery internal pressure was 4.5 kg/cm$^2$ (AA3, AA8, AA19 and AA24), the worst level of the high-rate discharge characteristic was 72% (AA3) and the worst level of the cycle characteristic was 1,100 cycles (AA19 and AA24). That is, where the present invention was applied, the levels of the initial battery internal pressure and the levels of the high-rate discharge characteristic were equivalent to or better than those offered by the one-stage acid treatment or the two-stage acid-alkali treatment. The worst levels of the cycle characteristic of the alloys AA19 and AA24 were substantially equivalent to the level offered by the acid-alkali treatment. This indicates that the two-stage acid treatment according to the present invention is effective.

Table 1 further indicates as follows.

The alloy AW2 treated only with a strong acid of pH1 in the one-stage acid treatment offered more excellent high-rate discharge characteristic and cycle characteristic than the alloy subjected to no acid treatment. However, the alloy AW 2 offered a significantly higher initial battery internal pressure than the alloy AW1. On the contrary, the alloys AA4 to AA7 respectively treated with weak acids of pH2.2, pH3.0, pH4.0 and pH5.0 in the two-stage acid treatment offered remarkable improvement in the initial battery internal pressure, the high-rate discharge characteristic and the cycle lifetime. On the other hand, the alloy AA2 treated with a strong acid in the second acid treatment offered an extremely high initial battery internal pressure, and the alloy AA3 treated with a strong acid of pH2 and the alloy AA8 treated with a weak acid of pH6 each offered a significantly high initial battery internal pressure.

The alloys AA11 and AA12 treated with acids of pH2.5 and pH5.0, respectively, in the first acid treatment and with a weak acid of pH4.0 in the second acid treatment offered an unsatisfactory improvement in the high-rate discharge characteristic and the cycle lifetime even though they were thus subjected to the two-stage acid treatment.

In view of cases where a strong acid of pH1 was used in the first acid treatment and acidic buffer solutions were used in the second acid treatment, the respective characteristics were significantly improved where buffer solutions of pH2.2 to pH5.0 were used (the alloys AA15 to AA18 and AA20 to AA23). On the contrary, a satisfactory improvement was not observed where a buffer solution of pH6.0 was used. This tendency is the same as the case where the acid solutions were used as a treatment solution in the second treatment (the alloys AA4 to AA8).

As apparent from the results of the alloy AW3 shown in Table 1, the two-stage acid-alkali treatment in which a strong acid was used for the first treatment and an alkaline aqueous solution was used for the second treatment was not able to satisfactorily improve the respective characteristics.

As can be understood from the results described above, the two-stage acid treatment according to the present invention in which a strong acid aqueous solution was used in the first acid treatment and a weak acid aqueous solution of a higher pH value than the strong acid solution was used in the second acid treatment provided a powdery hydrogen-absorbing alloy exhibiting preferable characteristics. Where the strong acid aqueous solution had a pH value of not lower than pH0.5 and not higher than pH2.0 and the weak acid aqueous solution had a pH value of not lower than pH2.2 and not higher than pH5.0, the respective characteristics were further improved. Where a buffer solution having a pH value of not lower than pH2.2 and not higher than pH5.0 was used as the weak acid aqueous solution, more preferable results were obtained.

The results shown in Table 1 will hereinafter be examined. The results of the alloy AW2 are considered as follows. When the powdery hydrogen-absorbing alloy is treated with the strong acid, an oxide layer and a hydroxide layer formed on an alloy surface are removed and an isolation layer such as of nickel is formed, thereby enhancing an electrochemical reaction of the alloy. Therefore, the high-rate discharge characteristic and the cycle characteristic are somewhat improved.

However, hydrogen ions in the treatment solution are consumed during the strong acid treatment, and the pH of the treatment solution gradually approaches a neutral level. Oxides and hydroxides of rare earth elements and the like formed on the alloy surface are dissolved in the treatment solution at the beginning of the treatment (at a stage where the pH value is low). However, at a stage where the pH value rises to exceed pH5, the ions of the rare earth elements and the like once dissolved in the treatment solution are deposited as hydroxides on the alloy surface to form a solid hydroxide layer on the alloy surface. This hydroxide layer cannot be removed by water washing. It is therefore considered that, where the one-stage acid treatment is performed, the newly formed hydroxide layer reduces the electrochemical reaction on the alloy, particularly, to deteriorate the initial battery internal pressure characteristic.

In the aforesaid case, the strong acid may be used in a large amount for the first acid treatment to complete the treatment before the pH value rises. However, it is difficult to substantially prevent the formation of the hydroxide layer, because the acid adhering onto the alloy surface continuously promotes the formation of the hydroxide layer until the treatment solution is completely removed. Even if the strong acid is used in an large amount, substantially the same consequence as described above is brought about and, in addition, such an inconvenience as loss of the alloy may result.

In contrast with the aforesaid conventional treatment method, the two-stage acid treatment according to the present invention provided excellent results, because the treatment with a weak acid aqueous solution following the first acid treatment caused the hydroxide layer formed during the first acid treatment to be dissolved for removal thereof.

It is expected that, when the pH value of the treatment solution exceeds pH5 in the second acid treatment using the weak acid aqueous solution, a hydroxide layer is again formed on the alloy surface. However, since the ion concentration of the rare earth elements and the like dissolved in the second treatment solution is significantly lower than that in the first treatment solution, the hydroxides are redeposited in a very small amount during the second acid treatment. Therefore, it is considered that the amount of the hydroxides removed from the alloy surface by the second treatment solution is overwhelmingly larger than the amount of the hydroxides newly deposited. That is, the two-stage acid treatment according to the present invention, which enables the hydroxide layer formed during the first acid treatment to be removed in the second acid treatment, improves the respective characteristics.

Next, the importance of the second acid treatment using the weak acid aqueous solution will next be examined. The alloy AA12 treated with a weak acid aqueous solution in the first acid treatment offered an improved initial battery internal pressure in comparison with a case (AW1) where no treatment was performed, but offered little improvement in the high-rate discharge characteristic and the cycle characteristic. This is because the weak acid used in the first treatment was not able to satisfactorily remove the hydroxide layer and the like formed on an alloy surface. More specifically, a satisfactory effect of the two-stage treatment cannot be expected even with the second treatment using the weak acid, unless an Ni-rich layer is formed after the oxide layer is removed from the alloy surface in the first treatment.

On the other hand, the alloy AA2 treated with a strong acid aqueous solution both in the first acid treatment and in the second acid treatment offered a deteriorated initial battery internal pressure. This is because the same phenomenon as occurring in the first acid treatment (i.e., the phenomenon that the rare earth elements and the like once dissolved are redeposited on the alloy surface) occurred in the second acid treatment. Therefore, it is required to use a weak acid in the second acid treatment.

Further, the alloys AA15 to AA18 and AA20 to AA23 each treated with the strong acid aqueous solution in the first treatment and with the weak acid buffer solution in an optimum pH range in the second treatment offered drastic improvement in the respective characteristics. This is because the second treatment solution was maintained within the optimum pH range which permitted the hydroxide layer to be readily dissolved therein and the pH thereof did not rise to a pH value at which ions of the rare earth elements and the like were redeposited. This indicates that the second acid treatment solution preferably has a buffer action.

Other remarks

Although hydrochloric acid was used as the strong acid in the aforesaid mode, the strong acid is not limited thereto. Other examples of specific strong acids to be used include nitric acid, hydrobromic acid, phosphinic acid, phosphonic acid and the like. The buffer solutions used in the second acid treatment are not limited to those employed in the aforesaid mode, but other various known buffer solutions may be employed.

Mode 2

Preparation of powdery hydrogen-absorbing alloy

Hydrogen-absorbing alloy powder was prepared in the same manner as in Mode 1 and, therefore, an explanation thereto is herein omitted.

Acid treatment

An aqueous solution of hydrochloric acid of pH1 was added to the powdery hydrogen-absorbing alloy thus prepared in an amount of 100% by weight with respect to the alloy, and then stirred in a stirring mixer until the pH value thereof reached pH7. Thus, acid-treated powdery hydrogen-absorbing alloy was obtained.

Experiment 21: Oxo-acid-salt surface treatment

Aqueous solutions of disodium hydrogen phosphate (hereinafter referred to as "$Na_2HPO_4$ solutions") respectively having concentrations of 0.5 wt %, 0.6 wt %, 1.0 wt %, 3.0 wt %, 5.0 wt %, 7.0 wt %, 10.0 wt % and 20.0 wt % were used as oxo acid salt solutions. Each of the solutions was added to the acid-treated powdery alloy free from the acid-treatment solution, and stirred in the stirring mixer for 10 minutes for an oxo-acid-salt stirring-wash treatment of the powdery alloy. Thereafter, the treatment solutions were removed, and the treated powdery alloys were dried. Thus, powdery hydrogen-absorbing alloys AB1 to AB8 respectively treated with the $Na_2HPO_4$ solutions having different concentrations were prepared.

It should be noted that a powdery hydrogen-absorbing alloy AX1 was subjected to neither the acid treatment nor the oxo-acid-salt surface treatment, and a powdery hydrogen-absorbing alloy AX2 was subjected only to the acid treatment. These powdery alloys were used as comparative references in the following experiments.

Experiment 22: Pure-water soaking treatment

For 24-hour pure-water soaking treatment, powdery alloys surface-treated with the respective $Na_2HPO_4$ solutions in the same manner as in Experiment 21 (AB1 to AB8) were each soaked in pure water (deionized water) for more than 24 hours. Thus, powdery alloys AB11 to AB18 were prepared.

Experiment 23: Pure-water stirring-wash treatment

For pure-water stirring-wash treatment, pure water was added to each of powdery alloys surface-treated with the respective $Na_2HPO_4$ solutions in the same manner as in Experiment 21 (AB1 to AB8) in an amount of 100% by weight with respect to the alloy, and stirred in the stirring mixer for 10 minutes. Thus, powdery alloys AB21 to AB28 were prepared.

Experiment 24: Oxo-acid-salt soaking treatment

For 24-hour oxo-acid-salt soaking treatment, powdery alloys surface-treated with the respective $Na_2HPO_4$ solutions in the same manner as in Experiment 21 (AB1 to AB8) were each soaked in 100% by weight of a 0.3 wt % $Na_2HPO_4$ solution with respect to the alloy for more than 24 hours. Thus, powdery alloys AB31 to AB38 were prepared.

Experiment 25: Oxo-acid-salt stirring-wash treatment

For oxo-acid-salt stirring-wash treatment, powdery alloys surface-treated with the respective $Na_2HPO_4$ solutions in the same manner as in Experiment 21 (AB1 to AB8) were each stirred in 100% by weigh of a 0.3 wt % $Na_2HPO_4$ solution with respect to the alloy for 10 minutes by means of the stirring mixer. Thus, powdery alloys AB41 to AB48 were prepared.

Experiment 26: Concentration of oxo acid salt and effect of soaking treatment

To examine the relationship between the concentration of an oxo acid salt solution and the effect of the oxo-acid salt soaking treatment, powdery alloys surface-treated with a 3 wt % $Na_2HPO_4$ solution in the same manner as in Experiment 21 (AB4) were respectively soaked in $Na_2HPO_4$ solutions (100% by weight with respect to the alloys) having concentrations of 0.1 wt %, 0.3 wt %, 0.5 wt %, 1.0 wt % and 1.5 wt % for 24-hour oxo-acid-salt soaking treatment. Thus, powdery alloys AB51 to AB55 were prepared.

Experiment 27: Concentration of oxo acid salt and effect of stirring-wash treatment To examine the relationship between the concentration of an oxo acid salt solution and the effect of the oxo-acid-salt stirring-wash treatment, powdery alloys surface-treated with a 3 wt % $Na_2HPO_4$ solution in the same manner as in Experiment 21 (AB4) were respectively stirred in Na$_2$HPO$_4$ solutions (100% by weight with respect to the alloys) having concentrations of 0.1 wt %, 0.3 wt %, 0.5 wt %, 1.0 wt % and 1.5 wt % for 10 minutes by means of the stirring mixer. Thus, powdery alloys AB61 to AB65 were prepared.

Fabrication of storage batteries

By using the powdery hydrogen-absorbing alloys prepared in the aforesaid manner, storage batteries were fabricated in the same manner as in Mode 1.

These storage batteries were used to evaluate the powdery hydrogen-absorbing alloys from aspects of the internal pressure characteristic at initial charging and the charge-discharge cycle characteristic.

Fabrication of test cells

By using the powdery hydrogen-absorbing alloys prepared in the aforesaid manner, test cells were fabricated in the same manner as in Mode 1.

These test cells were used to evaluate the powdery hydrogen-absorbing alloys from an aspect of the high-rate discharge characteristic.

Battery characteristics and evaluation thereof

The battery internal pressure characteristic at initial charging, the charge-discharge cycle characteristic and the high-rate discharge characteristic were determined under the same conditions as described in "Battery characteristics and evaluation thereof" in Mode 1.

The results are shown in Tables 2 to 8 along with the treatment conditions.

TABLE 2

| Alloy No. | Acid treatment pH1-HCL | Oxo-acid-salt surface treatment Na$_2$HPO$_4$ (wt %) | Soaking treatment Not performed | Stirring-wash treatment Not performed | Initial battery internal pressure kg/cm$^2$ | High-rate discharge characteristic % | Cycle lifetime Number |
|---|---|---|---|---|---|---|---|
| AX1 | — | — | — | — | 2.0 | 58 | 917 |
| AX2 | + | — | — | — | 5.3 | 88 | 1100 |
| AB1 | + | 0.5 | — | — | 5.0 | 88 | 1100 |
| AB2 | + | 0.6 | — | — | 2.5 | 90 | 1100 |
| AB3 | + | 1.0 | — | — | 1.5 | 92 | 1070 |
| AB4 | + | 3.0 | — | — | 1.0 | 95 | 1050 |
| AB5 | + | 5.0 | — | — | 1.0 | 95 | 1030 |
| AB6 | + | 7.0 | — | — | 1.5 | 92 | 1010 |
| AB7 | + | 10.0 | — | — | 2.0 | 90 | 1000 |
| AB8 | + | 20.0 | — | — | 3.5 | 88 | 950 |

TABLE 3

| Alloy No. | Acid treatment pH1-HCL | Oxo-acid-salt surface treatment Na$_2$HPO$_4$ (wt %) | Soaking treatment Pure water/ 24 hours | Stirring-wash treatment Not performed | Initial battery internal pressure kg/cm$^2$ | High-rate discharge characteristic % | Cycle lifetime Number |
|---|---|---|---|---|---|---|---|
| AB11 | + | 0.5 | + | — | 5.0 | 88 | 1100 |
| AB12 | + | 0.6 | + | — | 2.5 | 90 | 1100 |
| AB13 | + | 1.0 | + | — | 2.0 | 92 | 1120 |
| AB14 | + | 3.0 | + | — | 1.5 | 95 | 1130 |
| AB15 | + | 5.0 | + | — | 1.5 | 95 | 1130 |
| AB16 | + | 7.0 | + | — | 2.0 | 92 | 1120 |
| AB17 | + | 10.0 | + | — | 2.0 | 90 | 1110 |
| AB18 | + | 20.0 | + | — | 5.0 | 88 | 1000 |

TABLE 4

| Alloy No. | Acid treatment pH1-HCL | Oxo-acid-salt surface treatment Na$_2$HPO$_4$ (wt %) | Soaking treatment Not performed | Stirring-wash treatment Pure water | Initial battery internal pressure kg/cm$^2$ | High-rate discharge characteristic % | Cycle lifetime Number |
|---|---|---|---|---|---|---|---|
| AB21 | + | 0.5 | — | + | 5.0 | 88 | 1110 |
| AB22 | + | 0.6 | — | + | 2.0 | 90 | 1110 |
| AB23 | + | 1.0 | — | + | 2.0 | 92 | 1120 |
| AB24 | + | 3.0 | — | + | 1.5 | 95 | 1130 |
| AB25 | + | 5.0 | — | + | 1.5 | 95 | 1130 |
| AB26 | + | 7.0 | — | + | 2.0 | 92 | 1120 |
| AB27 | + | 10.0 | — | + | 2.5 | 90 | 1110 |
| AB28 | + | 20.0 | — | + | 5.0 | 88 | 1000 |

TABLE 5

| Alloy No. | Acid treatment pH1-HCL | Oxo-acid-salt surface treatment $Na_2HPO_4$ (wt %) | Soaking treatment $Na_2HPO_4$ (wt %) | Stirring-wash treatment Not performed | Initial battery internal pressure $kg/cm^2$ | High-rate discharge characteristic % | Cycle lifetime Number |
|---|---|---|---|---|---|---|---|
| AB31 | + | 0.5 | 0.3 | — | 5.0 | 88 | 1110 |
| AB32 | + | 0.6 | 0.3 | — | 2.0 | 90 | 1110 |
| AB33 | + | 1.0 | 0.3 | — | 1.5 | 92 | 1120 |
| AB34 | + | 3.0 | 0.3 | — | 1.0 | 95 | 1130 |
| AB35 | + | 5.0 | 0.3 | — | 1.0 | 95 | 1130 |
| AB36 | + | 7.0 | 0.3 | — | 1.5 | 92 | 1120 |
| AB37 | + | 10.0 | 0.3 | — | 2.0 | 90 | 1110 |
| AB38 | + | 20.0 | 0.3 | — | 5.0 | 88 | 1000 |

TABLE 6

| Alloy No. | Acid treatment pH1-HCL | Oxo-acid-salt surface treatment $Na_2HPO_4$ (wt %) | Soaking treatment Not performed | Stirring-wash treatment $Na_2HPO_4$ (wt %) | Initial battery internal pressure $kg/cm^2$ | High-rate discharge characteristic % | Cycle lifetime Number |
|---|---|---|---|---|---|---|---|
| AB41 | + | 0.5 | — | 0.3 | 5.0 | 88 | 1110 |
| AB42 | + | 0.6 | — | 0.3 | 2.0 | 90 | 1110 |
| AB43 | + | 1.0 | — | 0.3 | 1.5 | 92 | 1120 |
| AB44 | + | 3.0 | — | 0.3 | 1.0 | 95 | 1130 |
| AB45 | + | 5.0 | — | 0.3 | 1.0 | 95 | 1130 |
| AB46 | + | 7.0 | — | 0.3 | 1.5 | 92 | 1120 |
| AB47 | + | 10.0 | — | 0.3 | 2.0 | 90 | 1110 |
| AB48 | + | 20.0 | — | 0.3 | 5.0 | 88 | 1000 |

TABLE 7

| Alloy No. | Acid treatment pH1-HCL | Oxo-acid-salt surface treatment $Na_2HPO_4$ (wt %) | Soaking treatment $Na_2HPO_4$ (wt %) | Stirring-wash treatment Not performed | Initial battery internal pressure $kg/cm^2$ | High-rate discharge characteristic % | Cycle lifetime Number |
|---|---|---|---|---|---|---|---|
| AB51 | + | 3.0 | 0.1 | — | 1.0 | 95 | 1130 |
| AB52 | + | 3.0 | 0.3 | — | 1.0 | 95 | 1130 |
| AB55 | + | 3.0 | 0.5 | — | 1.0 | 95 | 1130 |
| AB54 | + | 3.0 | 1.0 | — | 1.0 | 95 | 1130 |
| AB55 | + | 3.0 | 1.5 | — | 1.0 | 95 | 1070 |

TABLE 8

| Alloy No. | Acid treatment pH1-HCL | Oxo-acid-salt surface treatment $Na_2HPO_4$ (wt %) | Soaking treatment Not performed | Stirring-wash treatment $Na_2HPO_4$ (wt %) | Initial battery internal pressure $kg/cm^2$ | High-rate discharge characteristic % | Cycle lifetime Number |
|---|---|---|---|---|---|---|---|
| AB61 | + | 3.0 | — | 0.1 | 1.0 | 95 | 1130 |
| AB62 | + | 3.0 | — | 0.3 | 1.0 | 95 | 1130 |
| AB63 | + | 3.0 | — | 0.5 | 1.0 | 95 | 1130 |
| AB64 | + | 3.0 | — | 1.0 | 1.0 | 95 | 1130 |
| AB65 | + | 3.0 | — | 1.5 | 1.0 | 95 | 1070 |

Figure 2:
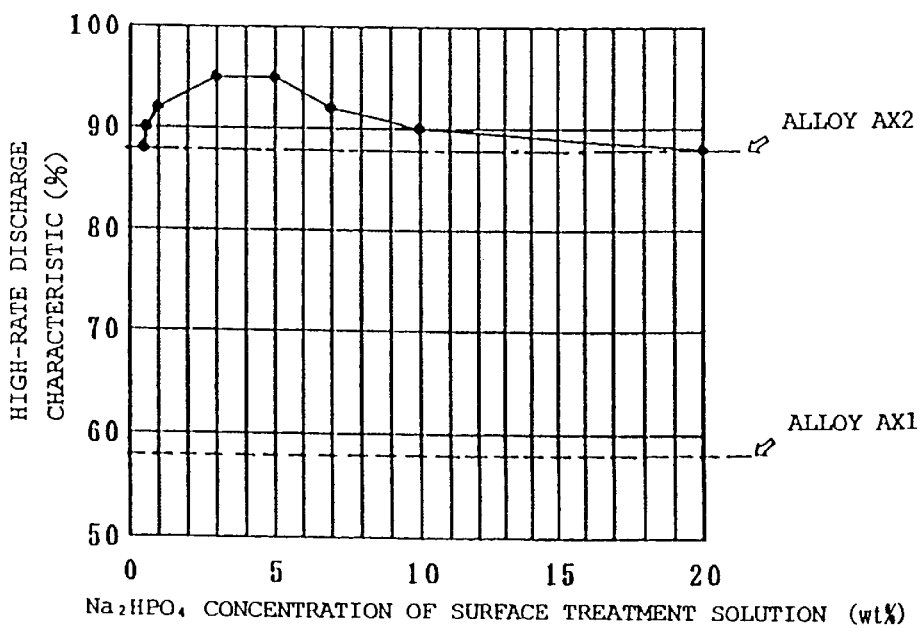
FIG. 2 is a graphical representation illustrating the relationship of $Na_2HPO_4$ concentration of the surface treatment solution used in the surface treatment of the hydrogen-absorbing alloy after the acid treatment versus a high-rate discharge characteristic.
Figure 3:
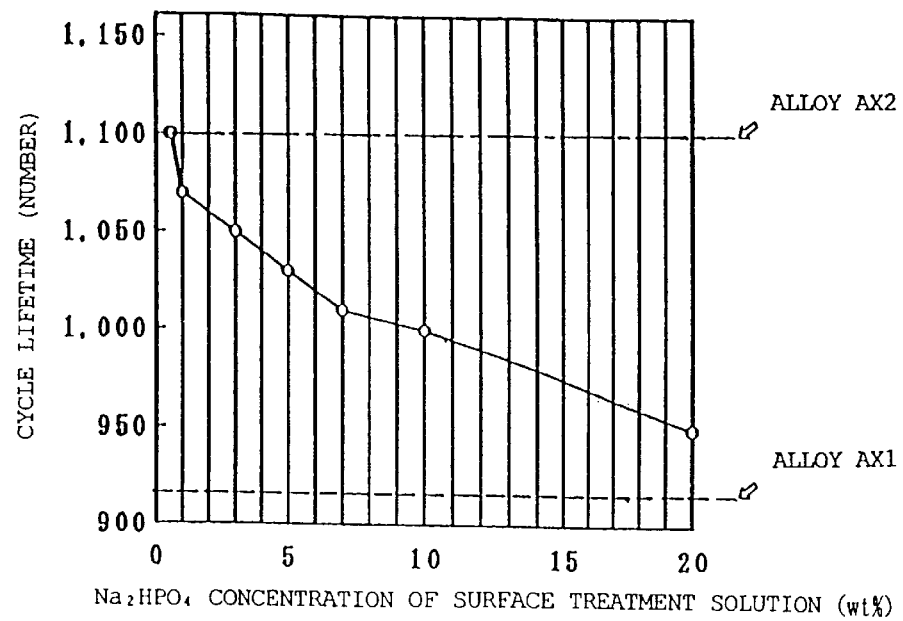
FIG. 3 is a graphical representation illustrating the relationship of $Na_2HPO_4$ concentration of the surface treatment solution used in the surface treatment of the hydrogen-absorbing alloy after the acid treatment versus a cycle lifetime.

FIGS. 1 to 3 are graphical representations illustrating the relationships between the $Na_2HPO_4$ concentration and the electrochemical characteristics of the powdery hydrogen-absorbing alloys AB1 to AB8 subjected to the acid treatment and to the surface treatment with the $Na_2HPO_4$ solutions having different concentrations. The graphs in FIGS. 1 to 3 also include the results for the alloy AX1 (dotted line) subjected to neither the acid treatment nor the oxo-acid-salt surface treatment and the alloy AX2 (dashed line) subjected only to the acid treatment as comparative references.

As can be seen from FIGS. 1 to 3, the alloys subjected to the $Na_2HPO_4$ surface treatment each offered a much smaller initial battery internal pressure and a high-rate discharge characteristic level equivalent to or higher than the alloy AX2 (dashed line) which was not subjected to the $Na_2HPO_4$ surface treatment after the acid treatment. The alloys treated with the $Na_2HPO_4$ solutions having concentrations of 0.6 wt % to 10 wt % provided particularly excellent results in the initial battery internal pressure and the high-rate discharge characteristic.

On the contrary, the alloys subjected to the $Na_2HPO_4$ treatment, as a whole, offered a shorter cycle lifetime than the alloy AX2, and the difference in the cycle lifetime increased with the increase in the $Na_2HPO_4$ concentration of the surface-treatment solution. In an $Na_2HPO_4$ concentration range between 0.6 wt % and 10 wt %, however, the difference was not so large. It should be noted that the scale of the ordinate of the graph in FIG. 3 is enlarged for clarity.

The alloys subjected to the $Na_2HPO_4$ surface treatment, regardless of the $Na_2HPO_4$ concentration of the $Na_2HPO_4$ solutions, offered remarkable improvement in the high-rate discharge characteristic and the cycle lifetime over the alloy AX1 (dotted line) subjected to neither the acid treatment nor the oxo-acid-salt surface treatment. In an $Na_2HPO_4$ concentration range between 0.8 wt % and 10 wt %, the initial battery internal pressure was lower than that of the alloy AX1. In an $Na_2HPO_4$ concentration range between 0.6 wt % and 10 wt %, the initial battery internal pressure was equivalent to or lower than that of the alloy AX1.

As can be understood from the foregoing results, the surface treatment with an $Na_2HPO_4$ solution having an $Na_2PHO_4$ concentration of 0.6 wt % to 10 wt % provides a powdery hydrogen-absorbing alloy which offers remarkable improvement in the initial battery internal pressure characteristic and the high-rate discharge characteristic without a considerable deterioration of the cycle characteristic.

Figure 4:
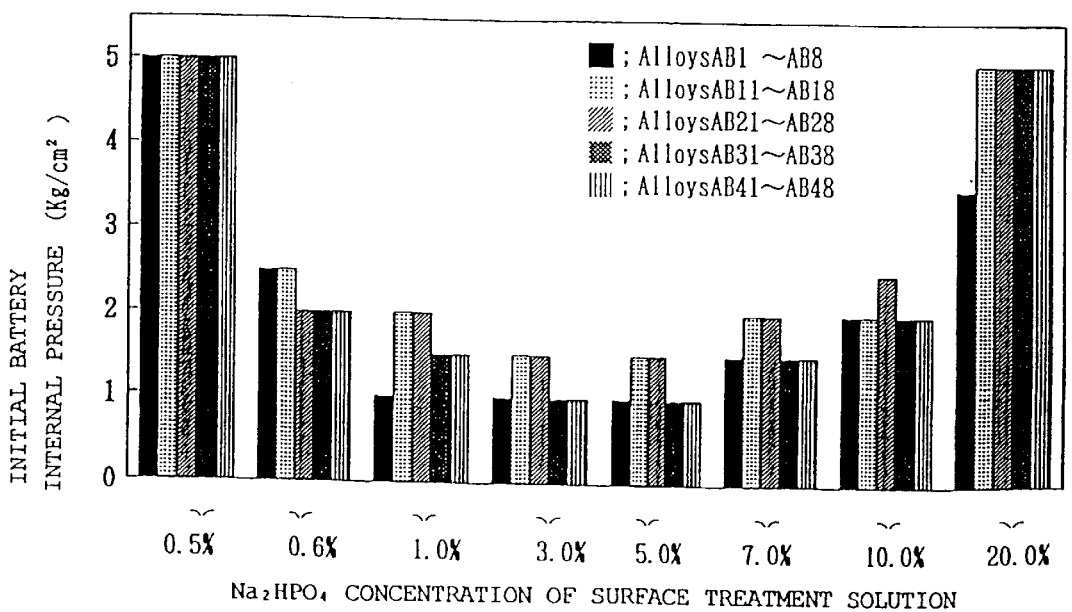
FIG. 4 is a graphical representation illustrating the relationship between conditions for treating the hydrogen-absorbing alloy after the acid treatment and an initial battery internal pressure.
Figure 5:
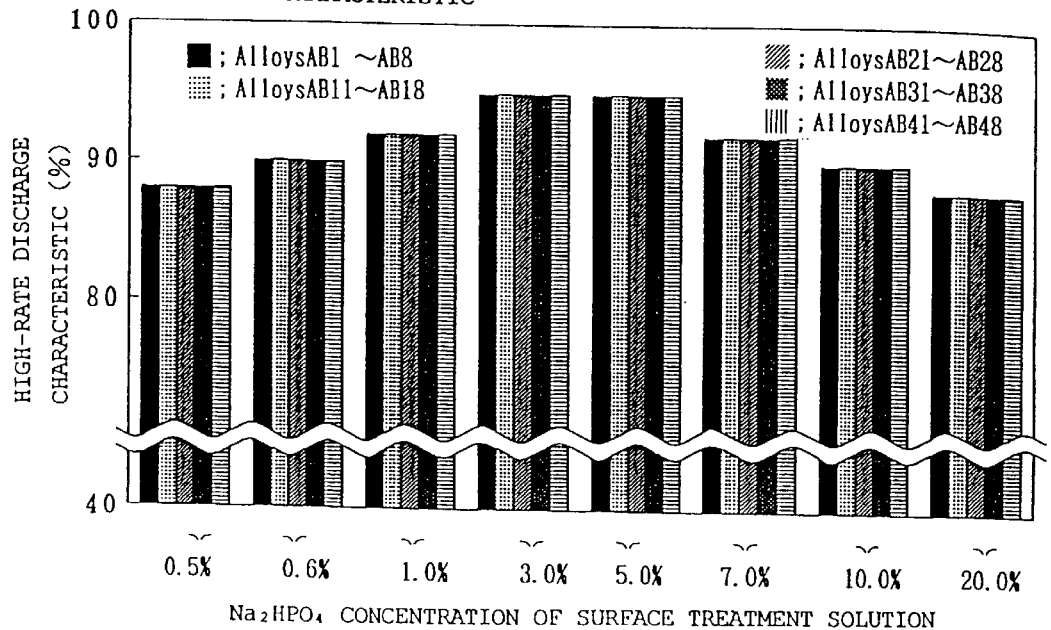
FIG. 5 is a graphical representation illustrating the relationship between conditions for treating the hydrogen-absorbing alloy after the acid treatment and a high-rate discharge characteristic.
Figure 6:
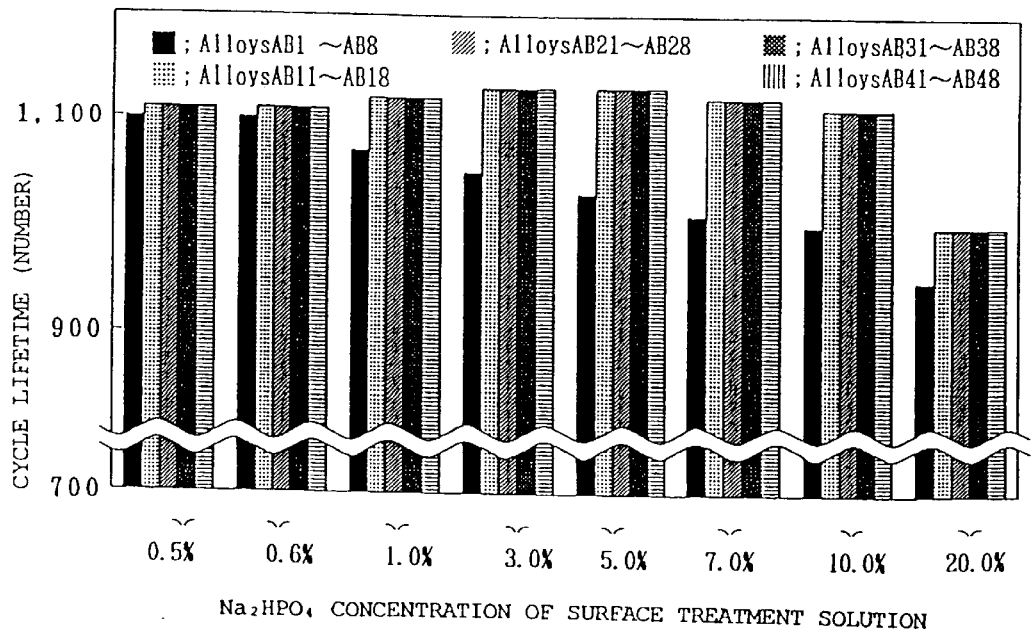
FIG. 6 is a graphical representation illustrating the relationship between conditions for treating the hydrogen-absorbing alloy after the acid treatment and a cycle lifetime.

Bar graphs in FIGS. 4 to 6, which are prepared on the basis of the results shown in Tables 2 to 5, will next be analyzed.

A comparison between the results shown in Tables 2, 3 and 4 indicates that the powdery alloys surface-treated with the $Na_2HPO_4$ solutions and then subjected to the soaking treatment in pure water for more than 24 hours or to the stirring-wash treatment in 100% by weight of pure water with respect to the alloys for 10 minutes offered improvement in the cycle lifetime with little influence to the initial battery internal pressure characteristic and the high-rate discharge characteristic.

Further, the powdery alloys surface-treated with the $Na_2HPO_4$ solutions and then subjected to the soaking treatment in the 0.3 wt % $Na_2HPO_4$ solution for more than 24 hours or to the stirring-wash treatment in 100% by weight of the 0.3 wt % $Na_2HPO_4$ solution with respect to the alloys for 10 minutes offered a remarkable increase in the cycle lifetime with little influence to the initial battery internal pressure and the high-rate discharge characteristic.

A comparison between the results shown in Tables 3 and 4 and the results shown in Tables 5 and 6 indicates that the alloys subjected to the soaking treatment or stirring-wash treatment in the $Na_2HPO_4$ solutions offered significantly improved characteristics over the alloys subjected to the same treatment in pure water.

The results of Experiments 2-6 and 2-7 performed on the basis of the foregoing results are shown in FIGS. 7 to 12.

Figure 7:
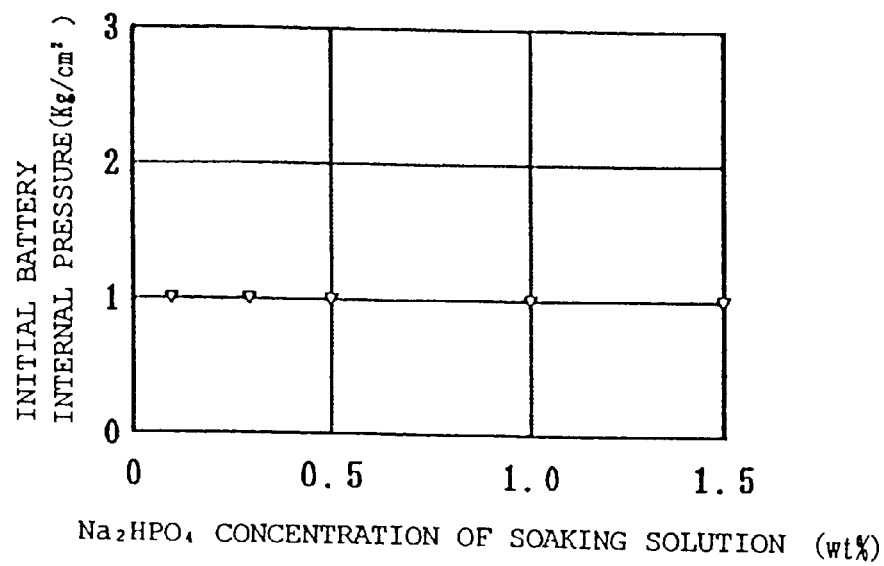
FIG. 7 is a graphical representation illustrating the relationship of $Na_2HPO_4$ concentration of a $Na_2HPO_4$ solution used for a soaking treatment of the hydrogen-absorbing alloy after the acid treatment versus an initial battery internal pressure.
Figure 8:
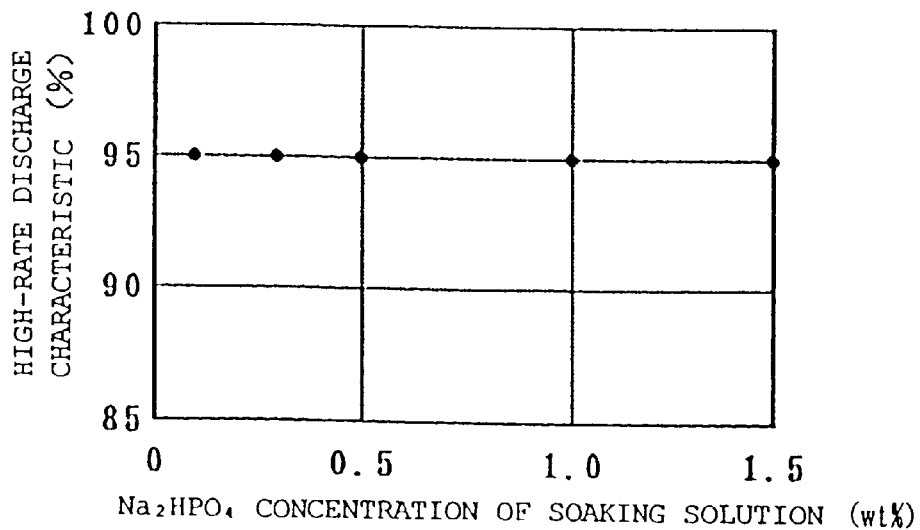
FIG. 8 is a graphical representation illustrating the relationship of $Na_2HPO_4$ concentration of the $Na_2HPO_4$ solution used for the soaking treatment of the hydrogen-absorbing alloy after the acid treatment versus a high-rate discharge characteristic.
Figure 9:
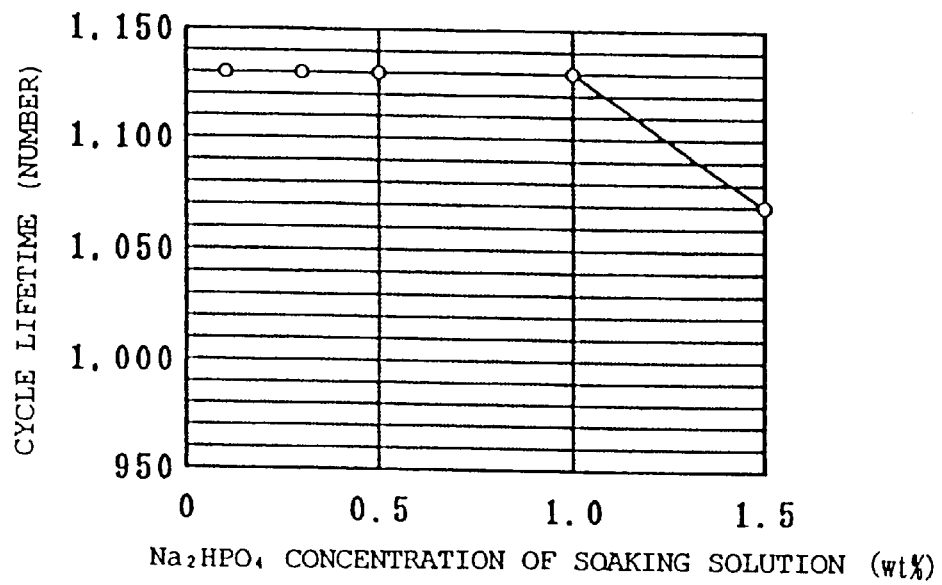
FIG. 9 is a graphical representation illustrating the relationship of $Na_2HPO_4$ concentration of the $Na_2HPO_4$ solution used for the soaking treatment of the hydrogen-absorbing alloy after the acid treatment versus a cycle lifetime.

FIGS. 7 to 9 are graphical representations illustrating variations in the electrochemical characteristics observed where the alloys surface-treated with the 3.0 wt % $Na_2HPO_4$ solution were soaked in the $Na_2PHO_4$ solutions having $Na_2HPO_4$ concentrations ranging from 0.1 wt % to 1.5 wt %. As can be seen from FIGS. 7 to 9, the initial battery internal pressure characteristic and the high-rate discharge characteristic were not influenced by the $Na_2HPO_4$ concentration (0.1 wt % to 1.5 wt %) of the soaking treatment solution, while the cycle characteristic was remarkably deteriorated when the 1.5 wt % $Na_2HPO_4$ solution was used. This indicates that the $Na_2HPO_4$ concentration (the concentration of the oxo acid salt) of the soaking treatment solution preferably ranges between 0.1 wt % and 1.0 wt %.

Figure 10:
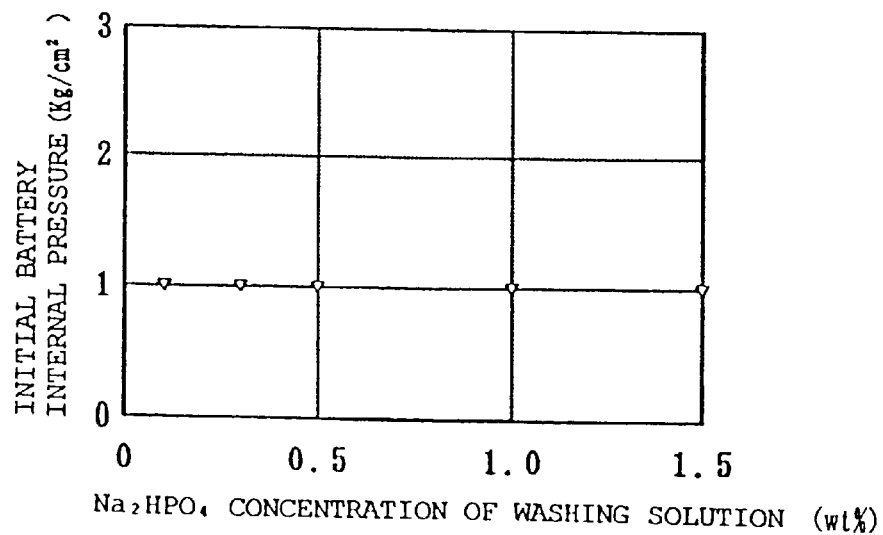
FIG. 10 is a graphical representation illustrating the relationship of $Na_2HPO_4$ concentration of a $Na_2HPO_4$ solution used for the stirring-wash treatment of the hydrogen-absorbing alloy after the acid treatment versus an initial battery internal pressure.
Figure 11:
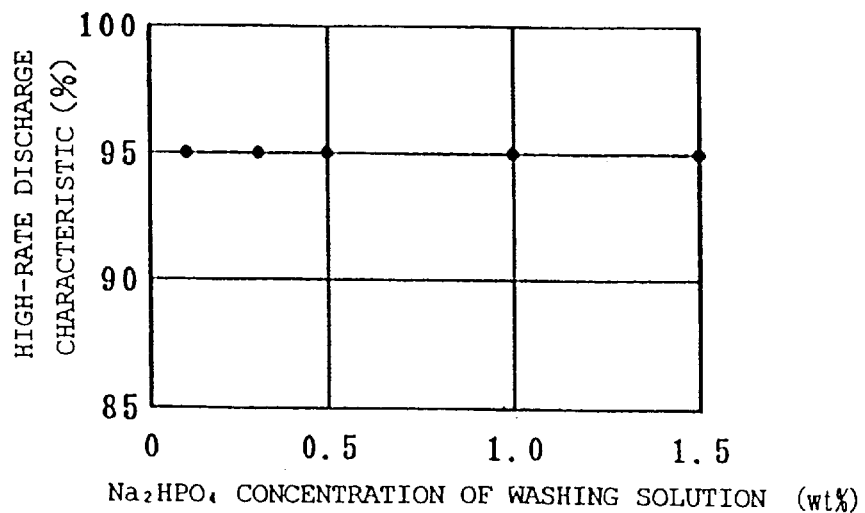
FIG. 11 is a graphical representation illustrating the relationship of $Na_2HPO_4$ concentration of a $Na_2HPO_4$ solution used for the stirring-wash treatment of the hydrogen-absorbing alloy after the acid treatment versus a high-rate discharge characteristic.
Figure 12:
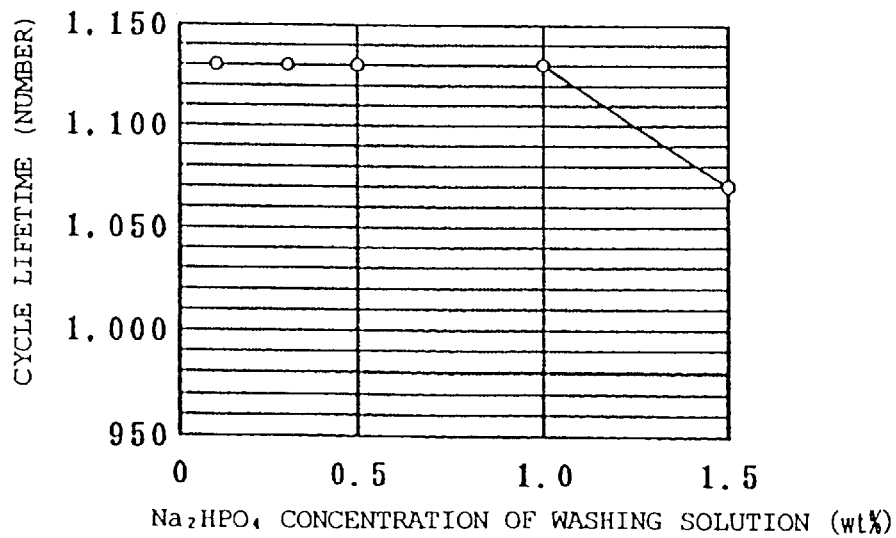
FIG. 12 is a graphical representation illustrating the relationship of $Na_2HPO_4$ concentration of the $Na_2HPO_4$ solution used for the stirring-wash treatment of the hydrogen-absorbing alloy after the acid treatment versus a cycle lifetime.

FIGS. 10 to 12 are graphical representations illustrating variations in the electrochemical characteristics observed where the alloys surface-treated with the 3.0 wt % $Na_2HPO_4$ solution were subjected to the stirring-wash treatment in the $Na_2HPO_4$ solutions having $Na_2HPO_4$ concentrations ranging from 0.1 wt % to 1.5 wt %. The results shown in FIGS. 10 to 12 are substantially the same as those shown in FIGS. 7 to 9, indicating that the initial battery internal pressure characteristic and the high-rate discharge characteristic were not influenced by the $Na_2HPO_4$ concentration (0.1 wt % to 1.5 wt %) of the stirring-wash treatment solution, while the cycle characteristic was remarkably deteriorated when the 1.5 wt % $Na_2HPO_4$ solution was used. This indicates that the $Na_2HPO_4$ concentration (the concentration of the oxo acid salt) of the stirring-wash treatment solution preferably ranges between 0.1 wt % and 1.0 wt %.

The soaking treatment in pure water or in the $Na_2HPO_4$ solutions for more than 24 hours and the stirring-wash treatment in pure water or in the $Na_2HPO_4$ solution for 10 minutes gave substantially the same results. Therefore, it is reasonable that, when there is enough time between the alloy treatment process and the subsequent process, the soaking treatment is employed and, when the subsequent process is to be performed immediately after the alloy treatment process, the stirring-wash treatment is employed. Thus, proper selection of the soaking treatment or the stirring-wash treatment allows for the saving of operating labor or time.

Other remarks

Although disodium hydrogen phosphate was used as the oxo acid salt in the experiments described above, other oxo acid salts such as sodium dihydrogen phosphate, dipotassium hydrogen phosphate, potassium dihydrogen phosphate, sodium hydrogen carbonate and potassium hydrogen carbonate may otherwise be used. Any of these oxo acid salts may provide the same effects as disodium hydrogen phosphate as shown in Tables 9 and 10.

TABLE 9

Dipotassium hydrogen phosphate used as oxo acid salt

| Alloy No. | Acid treatment pH1-HCL | Oxo-acid-salt surface treatment $K_2HPO_4$ (wt %) | Soaking treatment $K_2HPO_4$ (wt %) | Initial battery internal pressure kg/cm² | High-rate discharge characteristic % | Cycle lifetime Number |
|---|---|---|---|---|---|---|
| AB71 | + | 3.0 | 0.3 | 1.0 | 95 | 1130 |

TABLE 10

Sodium hydrogen carbonate used as oxo acid salt

| Alloy No. | Acid treatment pH1-HCL | Oxo-acid-salt surface treatment $NaHCO_3$ (wt %) | Soaking treatment $NaHCO_3$ (wt %) | Initial battery internal pressure kg/cm² | High-rate discharge characteristic % | Cycle lifetime Number |
|---|---|---|---|---|---|---|
| AB81 | + | 3.0 | 0.3 | 1.1 | 95 | 1135 |

Although a rare earth metal-nickel-based alloy was used as the hydrogen-absorbing alloy in the aforesaid experiments, the hydrogen-absorbing alloy to be employed in the present invention is not limited thereto. For example, titanium-nickel-based hydrogen-absorbing alloys and zirconium-based Laves-phase alloy may otherwise be employed.

Mode 3
Preparation of hydrogen-absorbing alloy

First, a cast mass (L) of a hydrogen-absorbing alloy represented by a composition formula of $MmNi_{3.4}Co_{0.8}Al_{0.2}Mn_{0.6}$ was prepared in the same manner as in Mode 1. The hydrogen-absorbing alloy cast mass (L) had a ununiform distortion of $5.4\times10^{-3}$. The hydrogen-absorbing alloy cast mass (L) was pulverized in an atmosphere of an inert gas to obtain a powdery alloy having a mean particle diameter of not greater than 150 μm.

The hydrogen-absorbing alloy cast mass (L) was otherwise annealed in an atmosphere of an inert gas at 1,000° C. for eight hours to obtain an annealed alloy (M). The annealed alloy (M) had a ununiform distortion of $2.5\times10^{-3}$. The alloy (M) was pulverized under the same conditions as described above to obtain another powdery alloy having a mean particle diameter of not greater than 150 μm.

The ununiform distortion is a cause of broading Debye ring and is measured through Laue camera or the like. The value is defined through the following formula (2).

$$\eta=\beta'/2 \tan \Theta \quad (2)$$

η: ununiform distortion
β': integral amplitude
Θ: Bragg's diffraction

Acid treatment and wash treatment

The thus prepared powdery alloys having different ununiform distortions were each soaked in a hydrochloric acid solution (pH=1) of an amount equivalent to the weight of the alloy, and the solution was stirred for 20 minutes by means of a stirring mixer for an acid treatment. Thereafter, the acid-treated powdery alloys were respectively subjected to a washing treatment under various conditions as shown in Table 11.

The washing treatment employed pure water or an aqueous solution containing 1 wt % disodium hydrogen phosphate dissolved in pure water (an aqueous solution containing anti-oxidation agent) as a washing solution. More specifically, the washing solution was poured in the stirring mixer, and then the acid-treated powdery alloys were each soaked in the washing solution of an amount equivalent to the weight of the alloy and stirred therein for a predetermined time period. After the stirring-wash treatment was performed for the predetermined time period, the washing solution was changed, and then the stirring-wash treatment was performed again for the predetermined time period. This operation was repeated until the chlorine (anion) concentration in the alloy was reduced to a predetermined level.

In Table 11, there are shown powdery alloys AC1 to AC6, AC11 to AC16, AC21 to AC26 and AC31 to AC36 which were obtained by treating the powdery alloys having the different ununiform distortions under different washing conditions. The chlorine concentration shown in Table 11 was determined by way of the atomic absorption spectrophotometry analysis, and the washing period was defined as (period of one stirring operation)×(number of repeated stirring operations).

Production of electrodes and batteries

By using the powdery alloys thus obtained, electrodes and batteries were produced in the same manner as in Mode 1.

Evaluation of conditions for washing treatment

The batteries thus obtained were each subjected to an initial activation process under the same conditions as in Mode 1.

Battery characteristics and evaluation thereof

Experiment 31

① Cycle characteristic

The same conditions as in Mode 1 were employed.

② High-rate charge-discharge characteristic

Charging: 100 mA×16 hours with a recess of 1 hour (room temperature)
Discharging: 4,000 mA (room temperature) with a discharge termination voltage of 1.0V and a recess of 1 hour ③ Low-temperature discharge characteristic Charging: 100 mA×16 hours (room temperature) with a recess of 1 hour (−10° C.)
Discharging: 1,000 mA with a discharge termination voltage of 1.0V (−10° C.)

TABLE 11

| | | Washing conditions | | Battery characteristics | | |
|---|---|---|---|---|---|---|
| Alloy No. | Kind of alloy Ununiform distortion | Washing period (period of one stirring operation × number of times) | Amount of residual chlorine in alloy (mol/g) | High-rate discharge characteristic (mAh) | Low-temperature discharge characteristic (mAh) | Cycle lifetime (cycle number) |
| AZ1 | $5.4 \times 10^{-3}$ | Not washed | Not washed | 850 | 600 | 450 |
| AC1 | " | *5 min. × 6 | $1 \times 10^{-6}$ | 922 | 883 | 675 |
| AC2 | " | *5 min. × 5 | $3 \times 10^{-6}$ | 921 | 881 | 670 |
| AC3 | " | *5 min. × 4 | $5 \times 10^{-6}$ | 920 | 880 | 660 |
| AC4 | " | *5 min. × 3 | $7 \times 10^{-6}$ | 905 | 820 | 550 |
| AC5 | " | *5 min. × 2 | $10 \times 10^{-6}$ | 904 | 819 | 543 |
| AC6 | " | *5 min. × 1 | $50 \times 10^{-6}$ | 900 | 800 | 520 |
| AC11 | " | **5 min. × 4 | $1 \times 10^{-6}$ | 939 | 904 | 680 |
| AC12 | " | **5 min. × 3 | $3 \times 10^{-6}$ | 939 | 900 | 680 |
| AC13 | " | **5 min. × 2 | $5 \times 10^{-6}$ | 938 | 898 | 675 |
| AC14 | " | **5 min. × 1 | $7 \times 10^{-6}$ | 915 | 829 | 550 |
| AC15 | " | **3 min. × 1 | $10 \times 10^{-6}$ | 911 | 828 | 543 |
| AC16 | " | **1 min. × 1 | $50 \times 10^{-6}$ | 908 | 808 | 520 |
| AZ21 | $2.5 \times 10^{-3}$ | Not washed | Not washed | 800 | 223 | 917 |
| AC21 | " | *5 min. × 6 | $1 \times 10^{-6}$ | 922 | 703 | 1170 |
| AC22 | " | *5 min. × 5 | $3 \times 10^{-6}$ | 921 | 702 | 1165 |
| AC23 | " | *5 min. × 4 | $5 \times 10^{-6}$ | 920 | 700 | 1160 |
| AC24 | " | *5 min. × 3 | $7 \times 10^{-6}$ | 906 | 638 | 1125 |
| AC25 | " | *5 min. × 2 | $10 \times 10^{-6}$ | 905 | 626 | 1123 |
| AC26 | " | *5 min. × 1 | $50 \times 10^{-6}$ | 901 | 620 | 1080 |
| AC31 | " | **5 min. × 4 | $1 \times 10^{-6}$ | 939 | 728 | 1188 |
| AC32 | " | **5 min. × 3 | $3 \times 10^{-6}$ | 938 | 727 | 1177 |
| AC33 | " | **5 min. × 2 | $5 \times 10^{-B}$ | 935 | 726 | 1170 |
| AC34 | " | **5 min. × 1 | $7 \times 10^{-6}$ | 919 | 648 | 1125 |
| AC35 | " | **3 min. × 1 | $10 \times 10^{-6}$ | 918 | 639 | 1123 |
| AC36 | " | **1 min. × 1 | $50 \times 10^{-6}$ | 914 | 634 | 1080 |

*Pure water used
**Disodium hydrogen phosphate used

The results will hereinafter be described on the basis of Table 11.

① Residual anion concentration and battery characteristics

Referring to Table 11, the relationship between the chlorine concentration in an alloy and the battery characteristics indicates that alloys having a chlorine concentration of not higher than $5 \times 10^{-6}$ mol/g among the alloys AC1 to AC6, AC 11 to AC16, AC 21 to AC 26 and AC31 to AC36 offered a remarkable improvement in the battery characteristics.

This indicates that the battery characteristics can be more effectively improved by washing the alloy until the concentration of residual anions is reduced to not higher than $5 \times 10^{-6}$ mol/g after the alloy is subjected to the acid treatment.

② Conditions for and effects of washing treatment

Comparisons between the alloys AC1 to AC6 and the alloys AC11 to AC 16 and between the alloys AC21 to AC26 and the alloys AC31 to AC36 indicate that the time (period of one stirring operation×number of repeated stirring operations) required to reduce the concentration of residual chlorine in the alloy to a predetermined level was shorter in the case where the aqueous solution containing disodium hydrogen phosphate (aqueous solution containing an anti-oxidation agent) was employed as the washing solution (**) than in the case where pure water was employed (*) Batteries that employed the alloys subjected to the washing treatment with the aqueous solution containing disodium hydrogen phosphate exhibited more excellent battery characteristics than batteries that employed the alloys subjected to the washing treatment with pure water and containing residual chlorine in the same concentration. Though not shown in Table 11, it was confirmed that the same effects can be ensured even if anti-oxidation agents (e.g., sodium boron hydride) other than disodium hydrogen phosphate was employed.

These results demonstrated that, where an alloy is washed with an aqueous solution containing an anti-oxidation agent after the acid treatment, anions can be removed from the alloy in a shorter time and, at the same time, battery characteristics can be effectively improved.

The reason why the effect of removing anions and the effect of improving the battery characteristics can be enhanced by employing the aqueous solution containing disodium hydrogen phosphate as the washing solution is as follows. Anions bonded to the rare earth elements and nickel during the acid treatment are not readily released into pure water. Where the aqueous solution containing disodium hydrogen phosphate is employed, on the other hand, anions such as chlorine ions bonded to the alloy components are exchanged with phosphate ions and the like and released into the solution. Therefore, the anions which have been bonded to the alloy components can be readily removed.

The phosphate ions and like anions remaining in the alloy in substitution for the chlorine ions and like anions exert less influence to the activity of the alloy and other components of the alkaline storage battery than the chlorine ions, thereby improving the battery characteristics.

Further, the alloys washed with the aqueous solution containing the anti-oxidation agent, even with the same anion concentration, offered more excellent battery characteristics. This is because the anti-oxidation agent adsorbed on the alloy surface enhanced the liquid-retaining ability of the alloy to improve the low-temperature discharge characteristic and the high-rate discharge characteristic. Further, the anti-oxidation agent adsorbed on the alloy surface suppressed the oxidation of the alloy by oxygen to improve the cycle lifetime.

Based on the results shown in Table 11, an influence of an initial pH of the acid treatment solution, the relationship between the ununiform distortion of an alloy and the effect of the washing treatment, and the effect of the soaking treatment will next be examined in detail.

Experiment 32

How the pH value of the acid solution used for the acid treatment of the alloy influenced the battery characteristics were examined in the following manner.

First, aqueous solutions of hydrochloric acid having various pH values (initial pH values) were prepared. Powdery alloys alloys having a ununiform distortion of $5.4 \times 10^{-3}$ and alloys having a uniform distortion of $2.5 \times 10^{-3}$ were respectively soaked in the aqueous solutions of hydrochloric acid of an amount substantially equivalent to the weight of the alloys. Then, the powdery alloys are each stirred therein by means of the stirring mixer until the pH value of the solution reached pH7. Thereafter, the acid-treated alloys were each washed with pure water until the amount of residual chlorine reached $5 \times 10^{-6}$ mol/g. Batteries were fabricated by using the alloys AC41 to AC49 and AC51 to AC59 thus subjected to the acid treatment with the solutions having different initial pH values. Then, the characteristics of these batteries were examined. A method for fabricating a battery, a method for determining battery characteristic and other conditions were the same as in Experiment 3-1.

The results are shown in Table 12. For the alloys AC41 to AC49 and AC51 to AC59 having different ununiform distortions, the battery characteristics were drastically deteriorated where the initial pH value of the acid treatment solution was lower than pH0.5 or higher than pH3.5. This indicates that the initial pH value of the acid treatment solution preferably ranges from pH0.5 to pH3.5.

Experiment 33

To examine the relationship between the ununiform distortion of an alloy and the effect of the treatment method according to the present invention, alloys having various ununiform distortions were prepared, and evaluated in the same manner as in Experiment 31.

The results were shown in Table 13.

The alloys AC3, AC23, AZ1 and AZ21 shown in Table 13 were the same as those used in Experiment 31, and alloys BZ1, BC3, CZ1, CC3, DZ1, DC3, EZ1 and EC3 were prepared employing different annealing temperatures (BZ1 and BC3: 550° C., CZ1 and CC3: 700° C., DZ1 and DC3: 750° C., EZ1 and EC3: 850° C.) so as to provide different non-uniform distortions. These alloys were each acid-treated with an aqueous solution of hydrochloric acid of pH1, and then washed with pure water until the chlorine concentration reached $5 \times 10^{-6}$ mol/g with respect to the alloy.

As is apparent from Table 13 the effectiveness ($\Delta$) of the acid treatment was notably different between ununiform distortions of $5.0 \times 10^{-3}$ and $4.0 \times 10^{-3}$. This indicates that the treatment method according to the present invention can be more effectively applied to the alloy having an ununiform distortion of $4.0 \times 10^{-3}$.

TABLE 12

| Alloy No. | Ununiform distortion of alloy | Initial pH of acid treatment solution | High-rate discharge characteristic(mAh) | Low-temperature discharge characteristic(mAh) | Cycle lifetime (cycle number) |
| --- | --- | --- | --- | --- | --- |
| AC41 | $5.4 \times 10^{-3}$ | 0.0 | 900 | 802 | 500 |
| AC42 | " | 0.5 | 916 | 877 | 655 |
| AC43 | " | 1.0 | 920 | 880 | 660 |
| AC44 | " | 1.5 | 919 | 879 | 658 |
| AC45 | " | 2.0 | 917 | 877 | 655 |
| AC46 | " | 2.5 | 916 | 876 | 652 |
| AC47 | " | 3.0 | 915 | 875 | 651 |
| AC48 | " | 3.5 | 914 | 874 | 650 |
| AC49 | " | 4.0 | 900 | 800 | 500 |
| AC51 | $2.5 \times 10^{-3}$ | 0.0 | 900 | 703 | 950 |
| AC52 | " | 0.5 | 918 | 702 | 1150 |
| AC53 | " | 1.0 | 920 | 700 | 1160 |
| AC54 | " | 1.5 | 918 | 698 | 1155 |
| AC55 | " | 2.0 | 917 | 697 | 1152 |
| AC56 | " | 2.5 | 916 | 696 | 1148 |
| AC57 | " | 3.0 | 915 | 695 | 1145 |
| AC58 | " | 3.5 | 914 | 694 | 1140 |
| AC59 | " | 4.0 | 901 | 620 | 950 |

TABLE 13

| Alloy No. | Ununiform distortion of alloy | Amount of residual chlorine in alloy | High-rate discharge characteristic(mAh) | Low-temperature discharge characteristic(mAh) | Cycle lifetime (cycle number) |
| --- | --- | --- | --- | --- | --- |
| AZ1 | $5.4 \times 10^{-3}$ | Not treated | 850 | 600 | 450 |
| AC3 | " | $5 \times 10^{-6}$ | 920 ($\Delta$70) | 880 ($\Delta$280) | 660 ($\Delta$210) |
| BZ1 | $5.0 \times 10^{-3}$ | Not treated | 840 | 500 | 550 |
| BC3 | " | $5 \times 10^{-6}$ | 920 ($\Delta$80) | 780 ($\Delta$280) | 760 ($\Delta$210) |
| CZ1 | $4.0 \times 10^{-3}$ | Not treated | 810 | 240 | 880 |
| CC3 | " | $5 \times 10^{-6}$ | 920 ($\Delta$110) | 730 ($\Delta$490) | 1100 ($\Delta$220) |
| DZ1 | $3.0 \times 10^{-3}$ | Not treated | 805 | 230 | 910 |

TABLE 13-continued

| Alloy No. | Ununiform distortion of alloy | Amount of residual chlorine in alloy | High-rate discharge characteristic(mAh) | Low-temperature discharge characteristic(mAh) | Cycle lifetime (cycle number) |
|---|---|---|---|---|---|
| DC3 | " | $5 \times 10^{-6}$ | 920 (Δ115) | 720 (Δ490) | 1155 (Δ245) |
| AZ21 | $2.5 \times 10^{-3}$ | Not treated | 800 | 223 | 917 |
| AC23 | " | $5 \times 10^{-6}$ | 920 (Δ120) | 700 (Δ477) | 1160 (Δ243) |
| EZ1 | $2.0 \times 10^{-3}$ | Not treated | 800 | 223 | 922 |
| EC3 | " | $5 \times 10^{-6}$ | 920 (Δ120) | 700 (Δ477) | 1165 (Δ243) |

Δ: Difference in level of characteristic between untreated alloy (upper row) and treated alloy (lower row)

Experiment 4

Alloys not subjected to the washing treatment and alloys subjected to the washing treatment were each soaked in pure water and in the aqueous solution containing disodium hydrogen phosphate at room temperature for one week. Thereafter, batteries were fabricated by using these alloys, and how the soaking solution would influence the battery characteristics was examined in substantially the same manner as in Experiment 3-1.

It should be noted that the alloys before the soaking treatment employed in this experiment were the same as those used in Experiment 31 for evaluation thereof and, in Table 14, each denoted by a prefix "K" plus a corresponding alloy number used in Table 11 were respectively correlative with the alloys shown in Table 14 with the same characters following "K". The treatment conditions other than the soaking condition can be found by referring to a corresponding alloy number in Table 11. Values shown on the left side of the arrows in Table 14 are battery characteristics for the alloys subjected to the soaking treatment in pure water, while values shown on the right side of the arrows in Table 14 are battery characteristics for the alloys subjected to the soaking treatment in an aqueous solution of 1 wt % disodium hydrogen phosphate.

TABLE 14

| Alloy No. | High-rate discharge characteristic(mAh) | Low-temperature discharge characteristic(mAh) | Cycle lifetime (cycle number) |
|---|---|---|---|
| KAZ21 | 800 → 800 | 223 → 223 | 917 → 917 |
| KAC31 | 939 → 954 | 728 → 748 | 1188 → 1199 |
| KAC32 | 938 → 953 | 727 → 747 | 1177 → 1190 |
| KAC33 | 935 → 950 | 726 → 746 | 1170 → 1187 |
| KAC34 | 919 → 922 | 648 → 653 | 1125 → 1130 |
| KAC35 | 918 → 921 | 639 → 645 | 1123 → 1130 |
| KAC36 | 914 → 917 | 634 → 645 | 1080 → 1090 |

(Soaking treatment in pure water) → (Soaking treatment in aqueous solution containing anti-oxidation agent)

As can be understood from Table 14, batteries fabricated by using the alloys KAC31 to KAC36 subjected to the soaking treatment in the aqueous solution of disodium hydrogen phosphate exhibited more excellent battery characteristics than batteries fabricated by using the alloys subjected to the soaking treatment in pure water.

This indicates that the anti-oxidation-agent containing aqueous solution is useful as the alloy soaking solution. In general, a hydrogen-absorbing alloy which is susceptible to oxidation is soaked in pure water or the like for temporary storage just before the fabrication of a battery. By using the anti-oxidation-agent containing aqueous solution as the temporary soaking solution, the storage and the washing treatment can be simultaneously achieved.

Other remarks

① Although the aqueous solution of disodium hydrogen phosphate is used for the explanation of this mode, the anti-oxidation agent to be used in the present invention is not limited thereto, as long as the agent is soluble in water at least to such an extent that its action can be ensured and the agent is capable of suppressing the oxidation of the hydrogen-absorbing alloy and dissolving oxides on the surface of the alloy for removal thereof. Examples of specific anti-oxidation agents besides disodium hydrogen phosphate used in this mode include dipotassium hydrogen phosphate, sodium hydrogen carbonate, potassium hydrogen carbonate, sodium boron hydride, potassium boron hydride, aluminum lithium hydride, sodium hypophosphate, potassium hypophosphate, formalin and formic acid. These anti-oxidation agents are all included in exemplary oxo acid salts to be used in Mode 2. Anti-oxidation agents other than oxo acid salts or reducing agents may, of course, be used in the present invention.

② Although the treatment solutions for the acid treatment and the washing treatment are used in an amount substantially equivalent to the weight of a powdery alloy in this mode, the amounts of the treatment solutions may, of course, be increased or decreased, but the weight ratio of the powdery alloy to the treatment solution is preferably 1:0.5 to 1:6 in consideration of convenience and efficiency of the treatments.

③ The hydrogen-absorbing alloy to be used in the method according to the present invention is not limited to those of rare earth element base, but titanium-based or Laves-based hydrogen-absorbing alloys may be employed.

Mode 4 production of electrodes and batteries

In Mode 4, electrodes and batteries were produced in substantially the same manner as in Mode 1, except that alloys were subjected to the two-stage acid treatment described in Mode 1, the oxo-acid-salt surface treatment described in Mode 2 and/or the washing treatment described in Mode 3 (some of the alloys were not subjected to the oxo-acid-salt surface treatment).

Battery characteristics and evaluation thereof

The initial battery internal pressure, the high-rate discharge characteristic and the cycle characteristic of the respective batteries were examined in the same manner as in Mode 1. The results are shown in Table 15 along with the conditions for the surface treatments and the washing treatment.

TABLE 15

| | Surface treatment conditions | | | Washing conditions | | Battery characteristics | | |
|---|---|---|---|---|---|---|---|---|
| | Two-stage acid treatment | | | Washing solution | | | | |
| Alloy No. | Kind and pH of acid for first treatment | Kind and pH of acid for second treatment | Oxo-acid-salt surface treatment Kind and concentration | Kind and concentration | Washing period | Amount of residual chlorine in alloy (mol/g) | Initial battery internal pressure (Kg/cm$^2$) | High-rate discharge characteristic (%) | Cycle lifetime (number) |
| AD1 | HCL −1.0 | HCL −4.0 | Not treated | Pure water | 5 min. × 2 | 10 × 10$^{-6}$ | 1.3 | 85 | 1150 |
| AD2 | HCL −1.0 | HCL −4.0 | Not treated | Pure water | 5 min. × 4 | 5 × 10$^{-6}$ | 0.7 | 88 | 1200 |
| AD3 | HCL −1.0 | HCL −4.0 | Not treated | Na$_2$HPO$_4$ 0.3 wt % | 5 min. × 4 | 1 × 10$^{-6}$ | 0.7 | 90 | 1300 |
| AD4 | HCL −1.0 | HCL −4.0 | Na$_2$HPO$_4$ 3 wt % | Pure water | 5 min. × 2 | 10 × 10$^{-6}$ | 0.7 | 88 | 1200 |
| AD5 | HCL −1.0 | HCL −4.0 | Na$_2$HPO$_4$ 3 wt % | Pure water | 5 min. × 4 | 5 × 10$^{-6}$ | 0.7 | 91 | 1300 |
| AD6 | HCL −1.0 | HCL −4.0 | Na$_2$HPO$_4$ 3 wt % | Na$_2$HPO$_4$ 0.3 wt % | 5 min. × 4 | 1 × 10$^{-6}$ | 0.5 | 95 | 1400 |

Referring to Table 15, comparisons between alloys AD1 and AD4, between alloys AD2 and AD5 and between alloys AD3 and AD6 indicate that the alloys subjected to the oxo-acid-salt surface treatment offered more excellent battery characteristics than the alloys not subjected to the oxo-acid-salt surface treatment. Further, comparisons between the alloys AD1 and AD2 and between the alloys AD4 and AD5 indicate that, where pure water was used for the washing treatment, the battery characteristics were improved with the increase in the washing period. Comparisons between the alloys AD2 and AD3 and between alloys AD5 and AD6 indicate that the battery characteristics were more excellent where the aqueous solution of disodium hydrogen phosphate was used as the washing solution for the washing treatment than where pure water was used.

Therefore, the oxo-acid-salt surface treatment and/or the washing treatment are preferably performed in addition to the two-stage acid treatment, and it is particularly preferred that an aqueous solution of disodium hydrogen phosphate is used for the washing treatment.

INDUSTRIAL APPLICABILITY

As described above, the method for treating a hydrogen-absorbing alloy for an alkaline storage battery in accordance with the present invention improves the electrochemical characteristics of the hydrogen-absorbing alloy, thereby enhancing the initial battery internal pressure characteristic, the low-temperature discharge characteristic, the high-rate discharge characteristic and the cycle characteristic. Therefore, the present invention is effective means for improving the performance of the alkaline storage battery using the hydrogen-absorbing alloy as a negative-electrode active substance.

We claim:

1. A method for producing a hydrogen-absorbing alloy electrode, for an alkaline storage battery comprising the steps of:
    preparing powdery hydrogen-absorbing alloy; and
    washing the powdery hydrogen-absorbing alloy with a strong acid solution and then with a weak acid solution having a higher pH value than the strong acid solution for a two-stage acid treatment.

2. A method for producing a hydrogen-absorbing alloy electrode for an alkaline storage battery as set forth in claim 1, wherein the pH value of the strong acid solution is not lower than pH0.5 and not higher than pH2.0, and
    wherein the pH value of the weak acid solution is not lower than pH2.2 and not higher than pH5.0.

3. A method for producing a hydrogen-absorbing alloy electrode for an alkaline storage battery as set forth in claim 2,
    wherein the weak acid solution is an aqueous buffer solution having a pH value of not lower than pH2.2 and not higher than pH5.0.

4. A method for producing a hydrogen-absorbing alloy electrode for an alkaline storage battery, comprises the steps of:
    preparing a powdery hydrogen-absorbing alloy;
    soaking the powdery hydrogen-absorbing alloy in an acid solution for an acid treatment; and
    surface-treating the acid-treated powdery hydrogen-absorbing alloy with an aqueous solution of a 0.6 wt % to 10 wt % oxo acid salt for an oxo-acid-salt surface treatment.

5. A method for producing a hydrogen-absorbing alloy electrode for an alkaline storage battery as set forth in claim 4, further comprising the step of soaking in pure water the powdery hydrogen-absorbing alloy subjected to the oxo-acid-salt surface treatment for pure-water soaking treatment.

6. A method for producing a hydrogen-absorbing alloy electrode for an alkaline storage battery as set forth in claim 4, further comprising the step of washing in pure water the powdery hydrogen-absorbing alloy subjected to the oxo-acid-salt surface treatment with stirring for pure-water stirring-wash treatment.

7. A method for producing a hydrogen-absorbing alloy electrode for an alkaline storage battery, comprising the steps of:
    preparing a powdery hydrogen-absorbing alloy;
    soaking the powdery hydrogen-absorbing alloy in an acid solution for an acid treatment;
    surface-treating the powdery hydrogen-absorbing alloy subjected to the acid treatment with a high-concentration aqueous solution of an oxo acid salt for a high-concentration oxo-acid-salt surface treatment; and washing the powdery hydrogen-absorbing alloy subjected to the high-concentration oxo-acid-salt surface treatment in a low-concentration aqueous solution of an oxo acid salt having a lower concentration than the high-concentration aqueous solution of the oxo acid salt with stirring for a low-concentration oxo-acid-salt stirring-wash treatment.

8. A method for producing a hydrogen-absorbing alloy electrode for an alkaline storage battery, comprising the steps of:

preparing a powdery hydrogen-absorbing alloy;

soaking the powdery hydrogen-absorbing alloy in an acid solution for an acid treatment;

surface-treating the powdery hydrogen-absorbing alloy subjected to the acid treatment with a high-concentration aqueous solution of an oxo acid salt for a high-concentration oxo-acid-salt surface treatment; and soaking the powdery hydrogen-absorbing alloy subjected to the high-concentration oxo-acid-salt surface treatment in a low-concentration aqueous solution of an oxo acid salt having a lower concentration than the high-concentration aqueous solution of the oxo acid salt for a low-concentration oxo-acid-salt soaking treatment.

9. A method for producing a hydrogen-absorbing alloy electrode for an alkaline storage battery as set forth in claim 7, wherein the high-concentration aqueous solution of the oxo acid salt has a concentration of 0.6 wt % to 10 wt %, and wherein the low-concentration aqueous solution of the oxo acid salt has a concentration of 0.1 wt % to 1 wt %.

10. A method for producing a hydrogen-absorbing alloy electrode for an alkaline storage battery, comprising the steps of:

preparing a powdery hydrogen-absorbing alloy;

treating the powdery hydrogen-absorbing alloy with an acid solution for an acid treatment; and washing the powdery hydrogen-absorbing alloy to such an extent that the amount of residual anions taken in the powdery hydrogen-absorbing alloy during the acid treatment is reduced to not higher than $5\times10^{-6}$ mol/g with respect to the powdery hydrogen-absorbing alloy for a washing treatment.

11. A method for producing a hydrogen-absorbing alloy electrode for an alkaline storage battery as set forth in claim 10, wherein the pH value of the acid solution is not lower than pH0.5 and not higher than pH3.5.

12. A method for producing a hydrogen-absorbing alloy electrode for an alkaline storage battery as set forth in claim 10, wherein an aqueous solution containing an anti-oxidation agent is used for the washing treatment.

13. A method for producing a hydrogen-absorbing alloy electrode for an alkaline storage battery as set forth in claim 10, further comprising the step of soaking the powdery hydrogen-absorbing alloy subjected to the washing treatment in an aqueous solution containing an anti-oxidation agent for a soaking-wash treatment after the washing treatment.

14. A method for producing a hydrogen-absorbing alloy electrode for an alkaline storage battery as set forth in claim 10, wherein the powdery hydrogen-absorbing alloy has a ununiform distortion of not higher than $4.0\times10^{-3}$.

15. A method for producing a hydrogen-absorbing alloy electrode, comprising the steps of:

preparing a powdery hydrogen-absorbing alloy;

washing the powdery hydrogen-absorbing alloy with a strong acid solution and then with a weak acid solution having a higher pH value than the strong acid solution for a two-stage acid treatment; and surface-treating the powdery hydrogen-absorbing alloy subjected to the two-stage acid treatment with an aqueous solution of a 0.6 wt % to 10 wt % oxo acid salt for an oxo-acid-salt surface treatment.

16. A method for producing a hydrogen-absorbing alloy electrode, comprising the steps of:

preparing a powdery hydrogen-absorbing alloy;

washing the powdery hydrogen-absorbing alloy with a strong acid solution and then with a weak acid solution having a higher pH value than the strong acid solution for a two-stage acid treatment; and washing the powdery hydrogen-absorbing alloy to such an extent that the amount of residual anions taken in the powdery hydrogen-absorbing alloy during the acid treatment is reduced to not higher than $5\times10^{-6}$ mol/g with respect to the powdery hydrogen-absorbing alloy.

17. A method for producing a hydrogen-absorbing alloy electrode, comprising the steps of:

preparing a powdery hydrogen-absorbing alloy;

washing the powdery hydrogen-absorbing alloy with a strong acid solution and then with a weak acid solution having a higher pH value than the strong acid solution for a two-stage acid treatment;

surface-treating the powdery hydrogen-absorbing alloy subjected to the two-stage acid treatment with an aqueous solution of a 0.6 wt % to 10 wt % oxo acid salt; and washing the powdery hydrogen-absorbing alloy to such an extent that the amount of residual anions taken in the powdery hydrogen-absorbing alloy during the acid treatment is reduced to not higher than $5\times10^{-6}$ mol/g with respect to the powdery hydrogen-absorbing alloy.

18. A method for producing a hydrogen-absorbing alloy electrode for an alkaline storage battery as set forth in claim 8, wherein the high-concentration aqueous solution of the oxo acid salt has a concentration of 0.6 wt % to 10 wt %, and wherein the low-concentration aqueous solution of the oxo acid salt has a concentration of 0.1 wt % to 1 wt %.

19. A method for producing a hydrogen-absorbing alloy electrode for an alkaline storage battery as set forth in claim 11, wherein an aqueous solution containing an anti-oxidation agent is used for the washing treatment.

20. A method for producing a hydrogen-absorbing alloy electrode for an alkaline storage battery as set forth in claim 11, further comprising the step of soaking the powdery hydrogen-absorbing alloy subjected to the washing treatment in an aqueous solution containing an anti-oxidation agent for a soaking-wash treatment after the washing treatment.

21. A method for producing a hydrogen-absorbing alloy electrode for an alkaline storage battery as set forth in claim 12, further comprising the step of soaking the powdery hydrogen-absorbing alloy subjected to the washing treatment in an aqueous solution containing an anti-oxidation agent for a soaking-wash treatment after the washing treatment.

22. A method for producing a hydrogen-absorbing alloy electrode for an alkaline storage battery as set forth in claim 11, wherein the powdery hydrogen-absorbing alloy has a ununiform distortion of not higher than $4.0 \times 10^{-3}$.

23. A method for producing a hydrogen-absorbing alloy electrode for an alkaline storage battery as set forth in claim 12, wherein the powdery hydrogen-absorbing alloy has a ununiform distortion of not higher than $4.0 \times 10^{-3}$.

24. A method for producing a hydrogen-absorbing alloy electrode for an alkaline storage battery as set forth in claim 13, wherein the powdery hydrogen-absorbing alloy has a ununiform distortion of not higher than $4.0 \times 10^{-3}$.

* * * * *

UNITED STATES PATENT AND TRADEMARK OFFICE
CERTIFICATE OF CORRECTION

PATENT NO.   : 6,010,582
DATED        : January 4, 2000
INVENTOR(S)  : Tadashi Ise, et al.

It is certified that error appears in the above-identified patent and that said Letters Patent is hereby corrected as shown below:

Column 14:
Line 1, after "Experiment" delete "21" and insert --2-1--;

Column 14:
Line 21, after "Experiment" delete "22" and insert --2-2--;

Column 14:
Line 24, after "Experiment" delete "21" and insert --2-1--;

Column 14:
Line 28, after "Experiment" delete "23" and insert --2-3--;

Column 14:
Line 32, after "Experiment" delete "21" and insert --2-1--;

Column 14:
Line 36, after "Experiment" delete "24" and insert --2-4--;

Column 14:
Line 43, after "Experiment" delete "25" and insert --2-5--;

Column 14:
Line 46, after "Experiment" delete "21" and insert --2-1--;

Column 14:
Line 51, after "Experiment" delete "26" and insert --2-6--.

Column 14:
Line 56, and 57, after "Experiment" delete "21" and insert --2-1--;

UNITED STATES PATENT AND TRADEMARK OFFICE
CERTIFICATE OF CORRECTION

PATENT NO. : 6,010,582
DATED : January 4, 2000
INVENTOR(S) : Tadashi Ise, et al.

It is certified that error appears in the above-identified patent and that said Letters Patent is hereby corrected as shown below:

Column 14:
Line 62, after "Experiment" delete "27" and insert --2-7--;

Column 15:
Line 1, after "Experiment" delete "21" and insert --2-1--;

Column 22:
Line 52, after "Experiment" delete "31" and insert --3-1--;

Column 25:
Line 4, after "Experiment" delete "32" and insert --3-1--;

Column 26:
Line 1, after "Experiment" delete "33" and insert --3-3--;

Column 26:
Line 8, after "Experiment" delete "31" and insert --3-1--;

UNITED STATES PATENT AND TRADEMARK OFFICE
CERTIFICATE OF CORRECTION

PATENT NO.   : 6,010,582
DATED        : January 4, 2000
INVENTOR(S)  : Tadashi Ise, et al.

It is certified that error appears in the above-identified patent and that said Letters Patent is hereby corrected as shown below:

<u>Column 26:</u>
Line 15, after Experiment delete "31" and insert --3-1--;

<u>Column 26:</u>
Line 31, after "4.0x $10^{-3}$" insert --or lower--;

<u>Column 27:</u>
Line 24, after "Experiment" delete "31" and insert --3-1--;

Signed and Sealed this

Twelfth Day of June, 2001

*Attest:*

NICHOLAS P. GODICI
*Attesting Officer Acting Director of the United States Patent and Trademark Office*